Jan. 29, 1957   J. DOLZA ET AL   2,779,422
ENGINE FUEL CONTROLLER
Filed Oct. 5, 1951   32 Sheets-Sheet 4

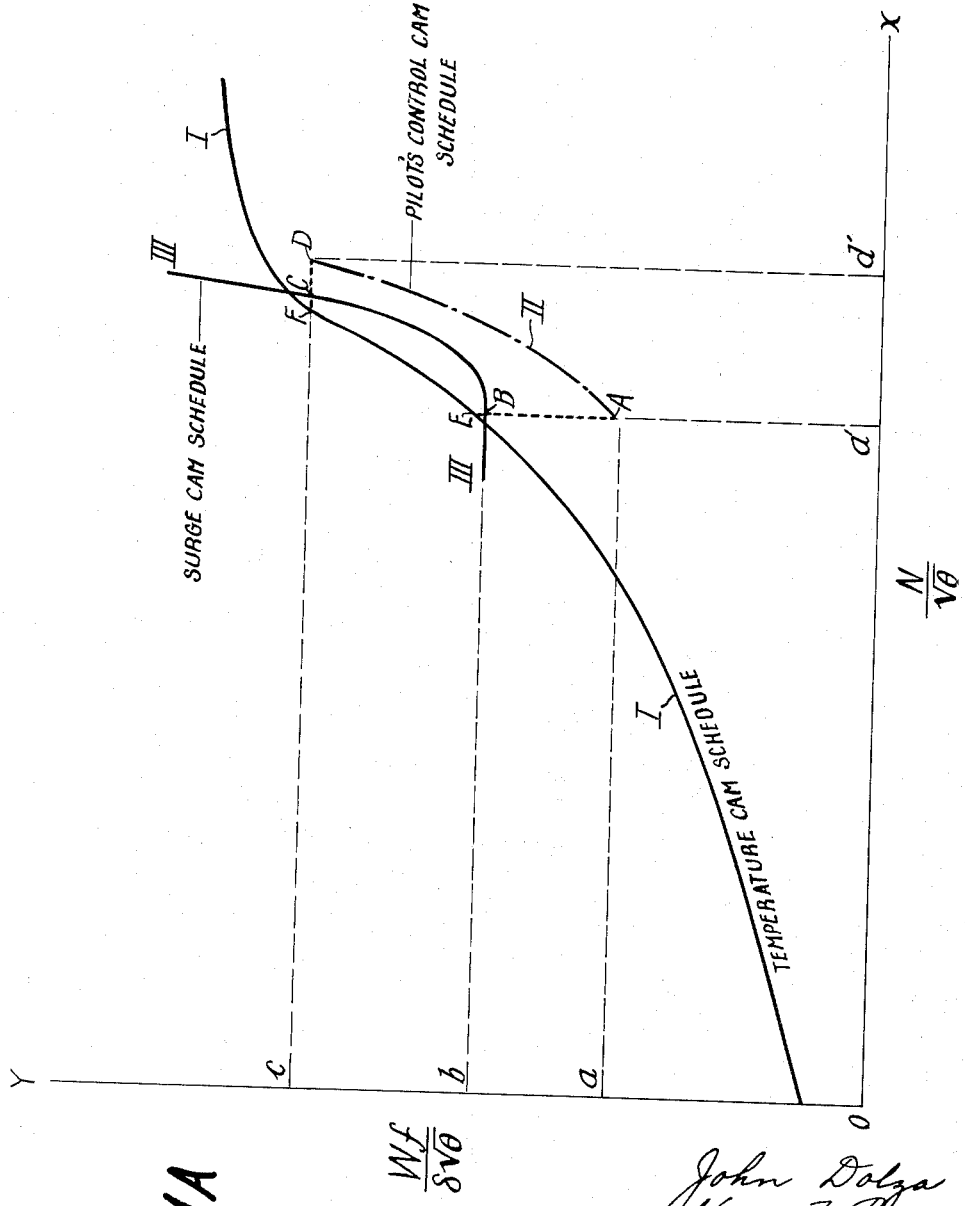

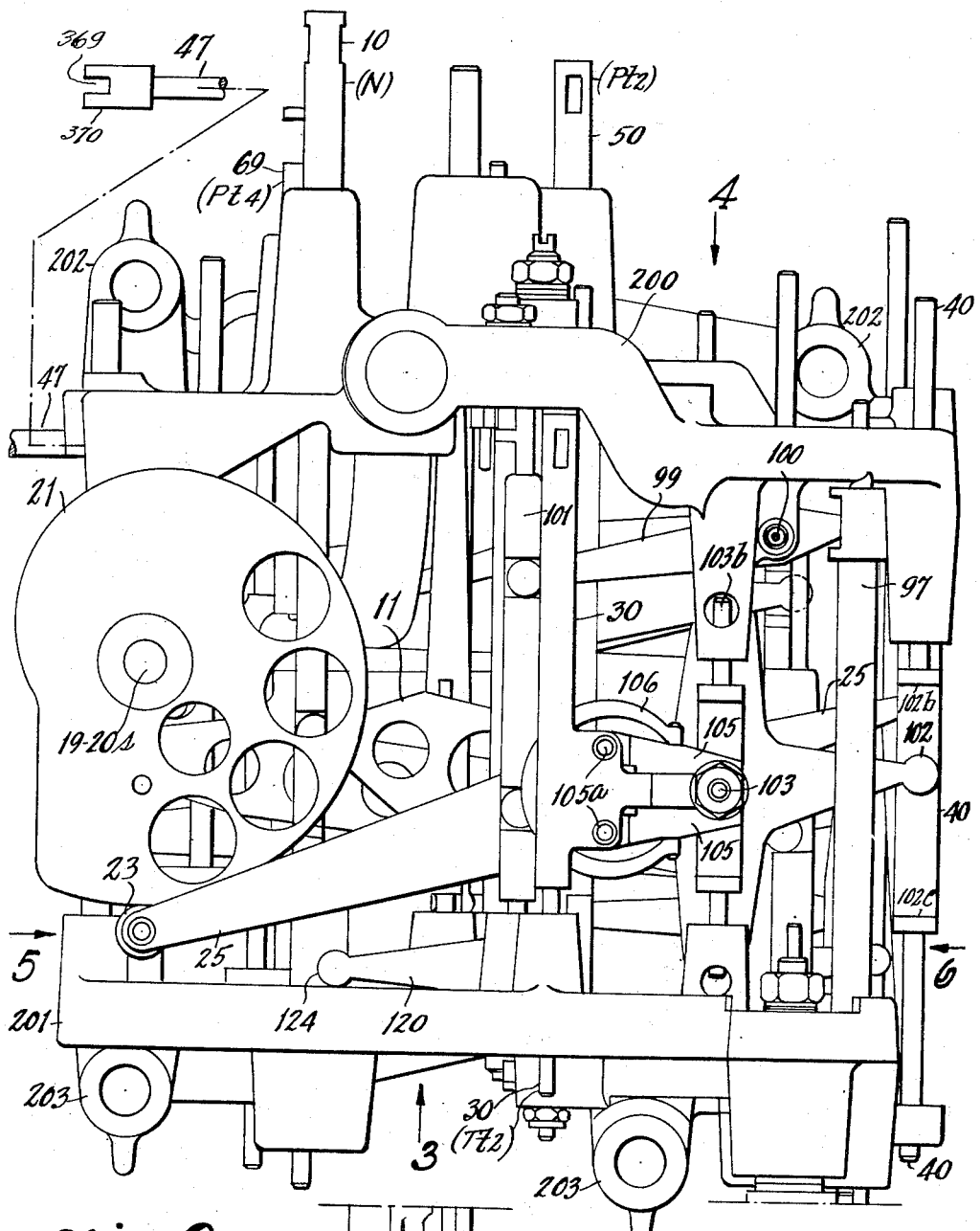

John Dolza
Harry F. Pease
INVENTORS
BY Willits Hardman
and Fehr
their attorneys

Jan. 29, 1957
J. DOLZA ET AL
2,779,422
ENGINE FUEL CONTROLLER
Filed Oct. 5, 1951
32 Sheets-Sheet 5
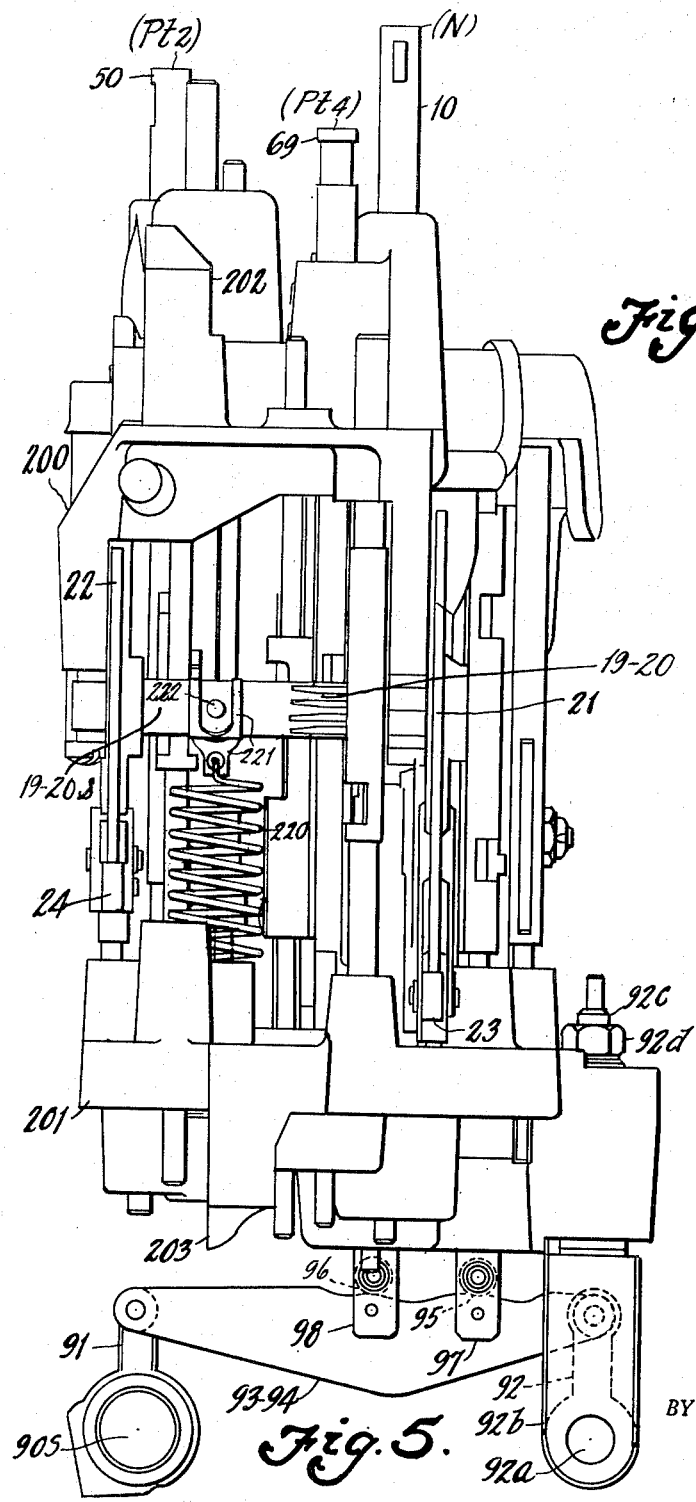
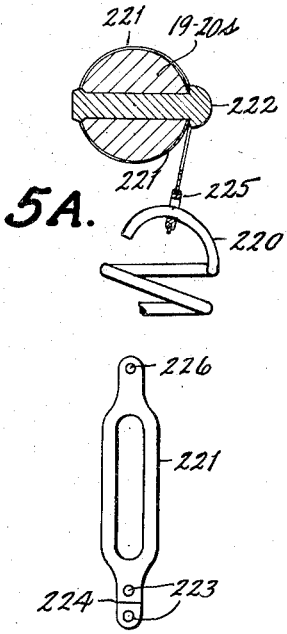
Fig. 5A.
Fig. 5B.
Fig. 5.
John Dolza
Harry F. Pease
INVENTORS
BY Willits Hardman
and Fehr
their attorneys

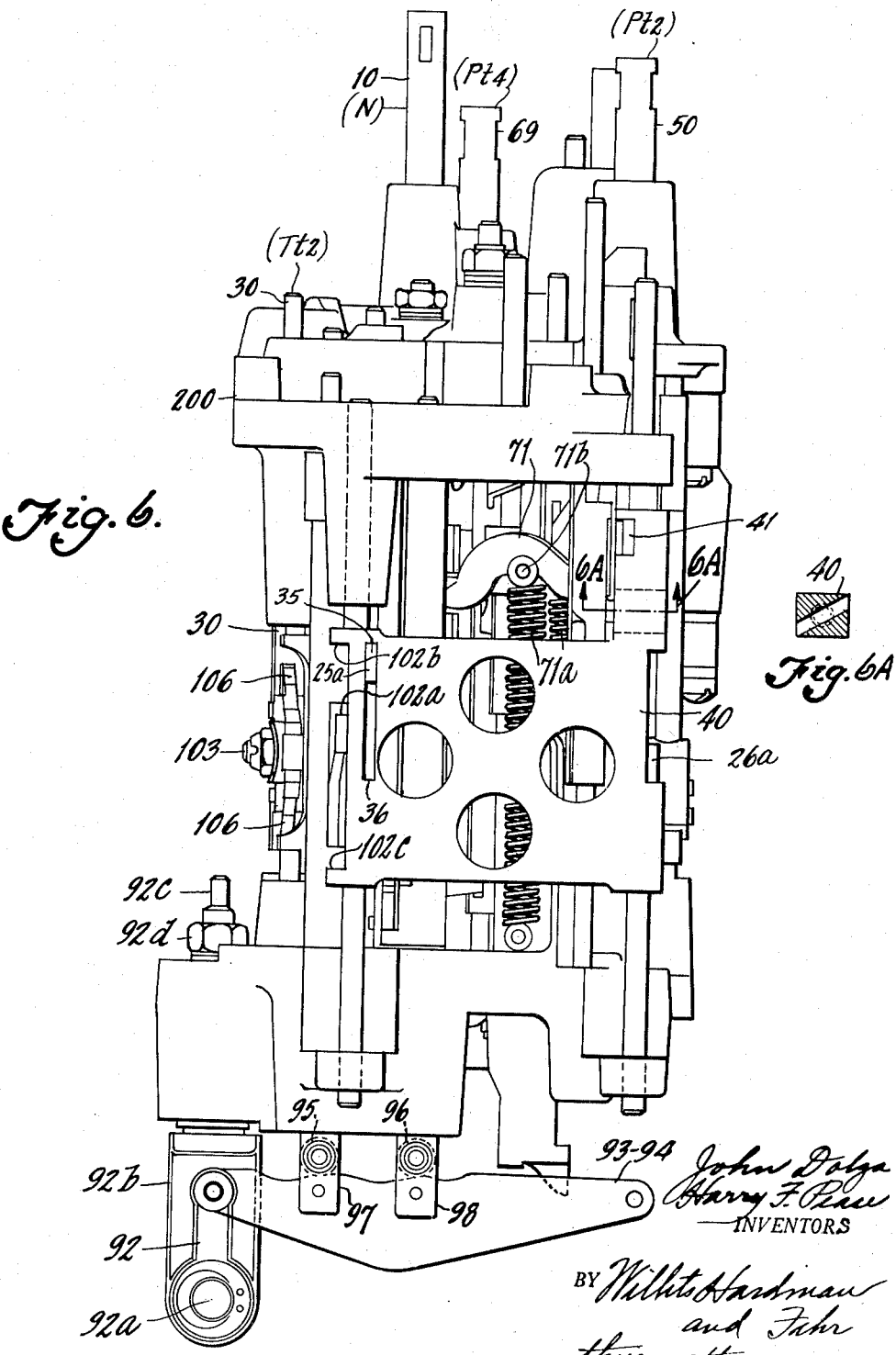

Jan. 29, 1957 J. DOLZA ET AL 2,779,422
ENGINE FUEL CONTROLLER
Filed Oct. 5, 1951 32 Sheets-Sheet 7
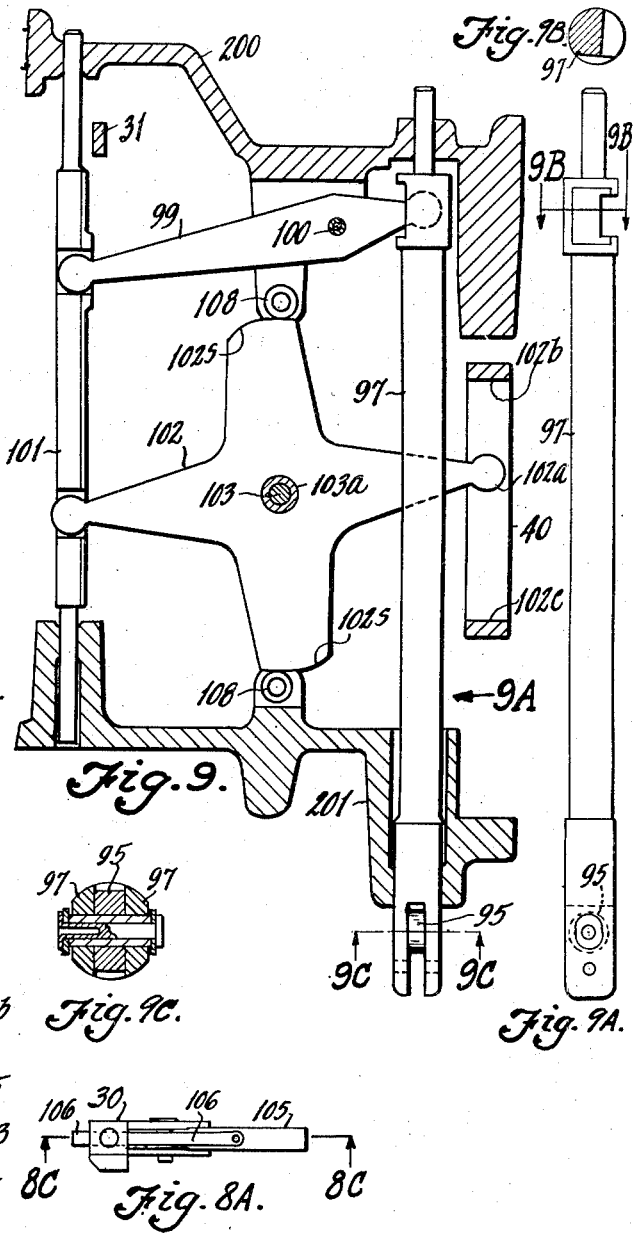
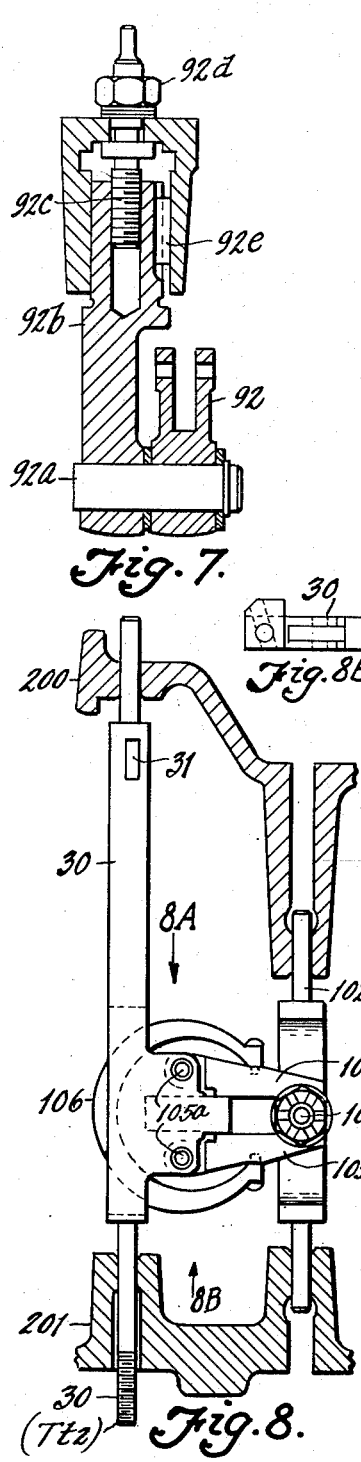
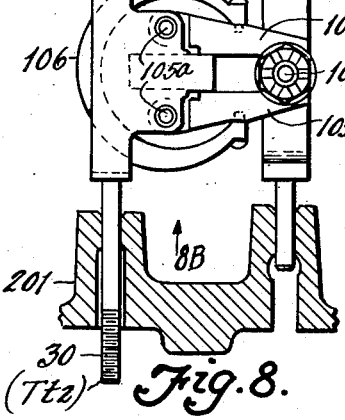

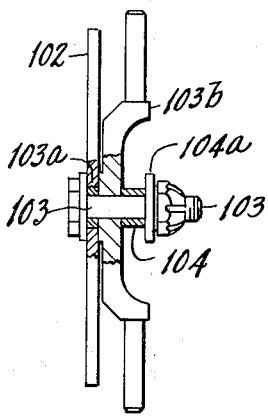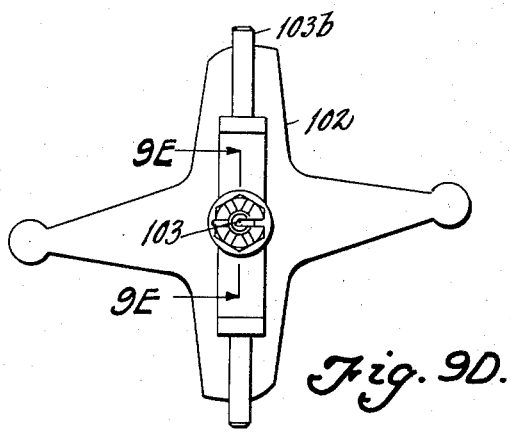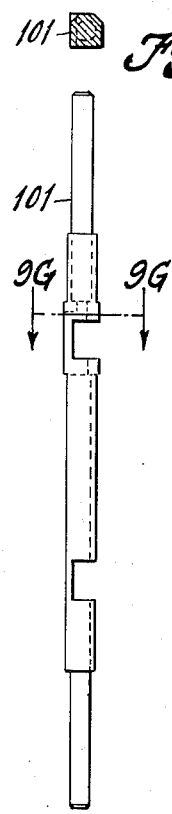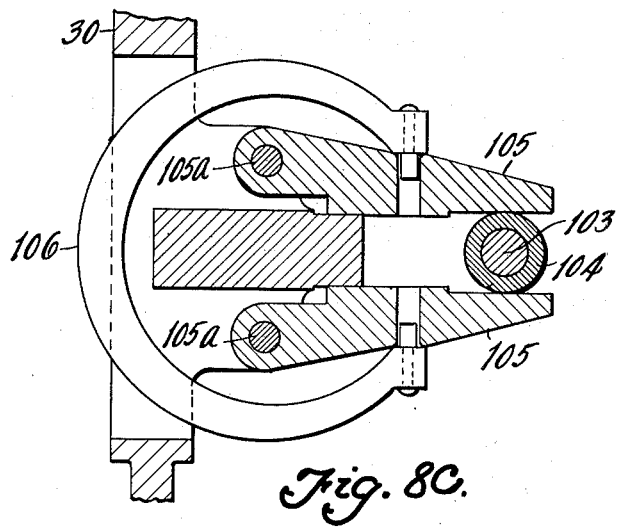

Jan. 29, 1957  J. DOLZA ET AL  2,779,422
ENGINE FUEL CONTROLLER
Filed Oct. 5, 1951  32 Sheets-Sheet 9
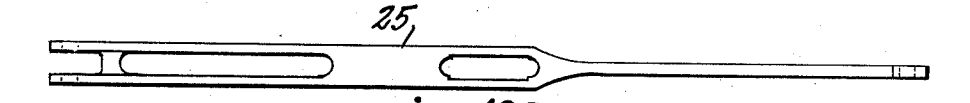
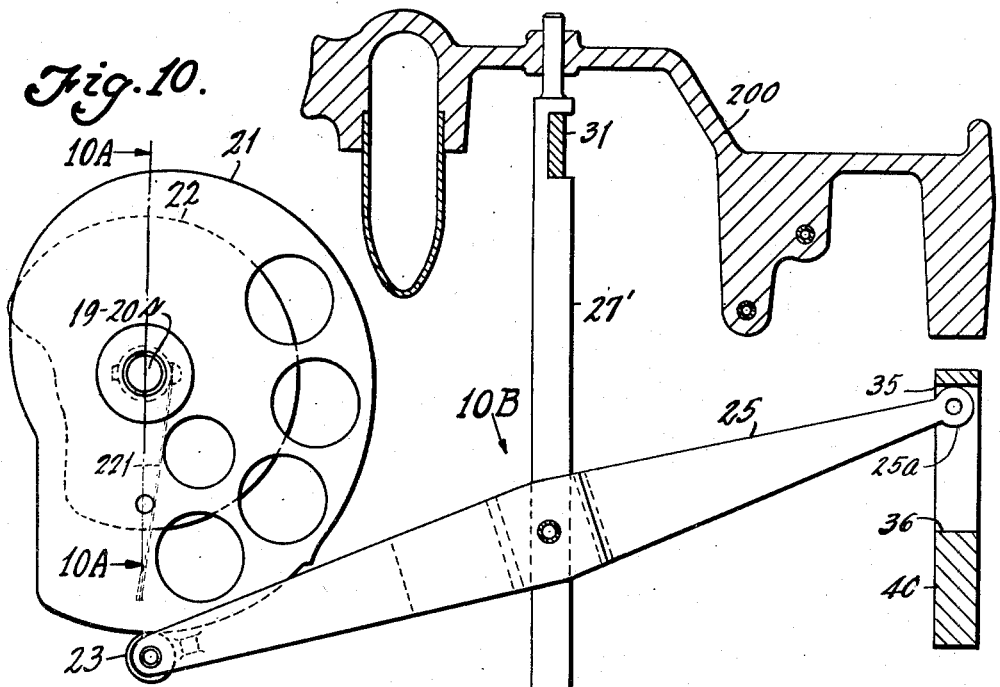
John Dolza
Harry F. Pease
INVENTORS
BY Willits Hartman
and Fehr
their attorneys

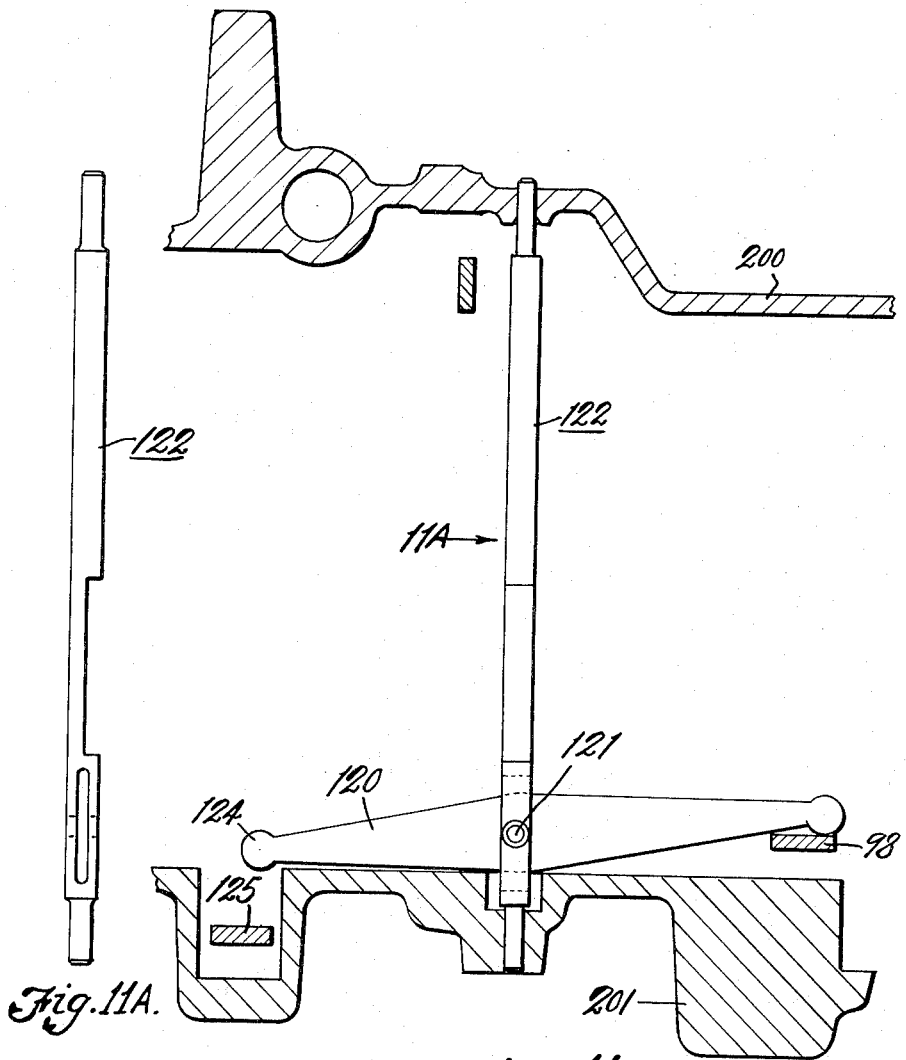

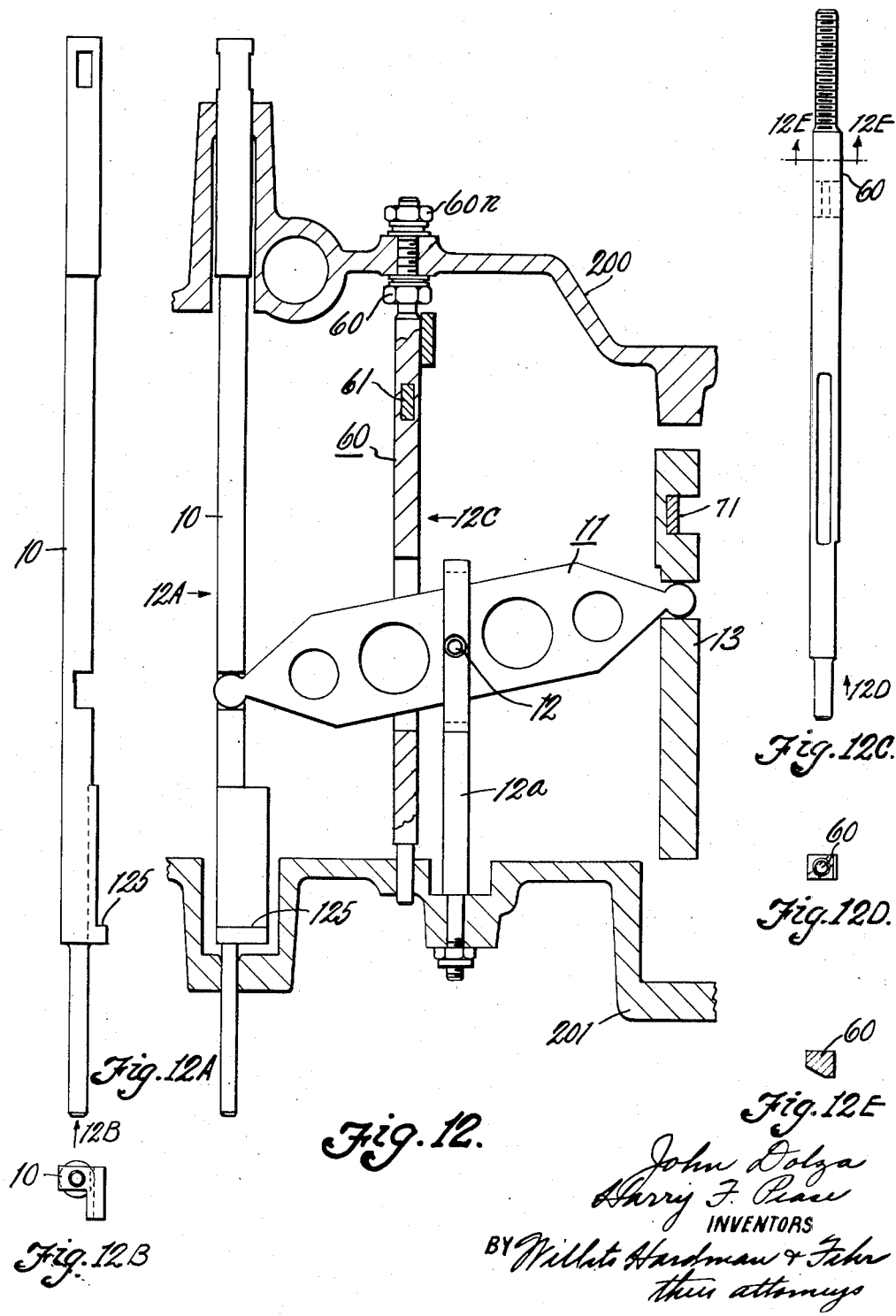

Jan. 29, 1957   J. DOLZA ET AL   2,779,422
ENGINE FUEL CONTROLLER
Filed Oct. 5, 1951   32 Sheets-Sheet 12
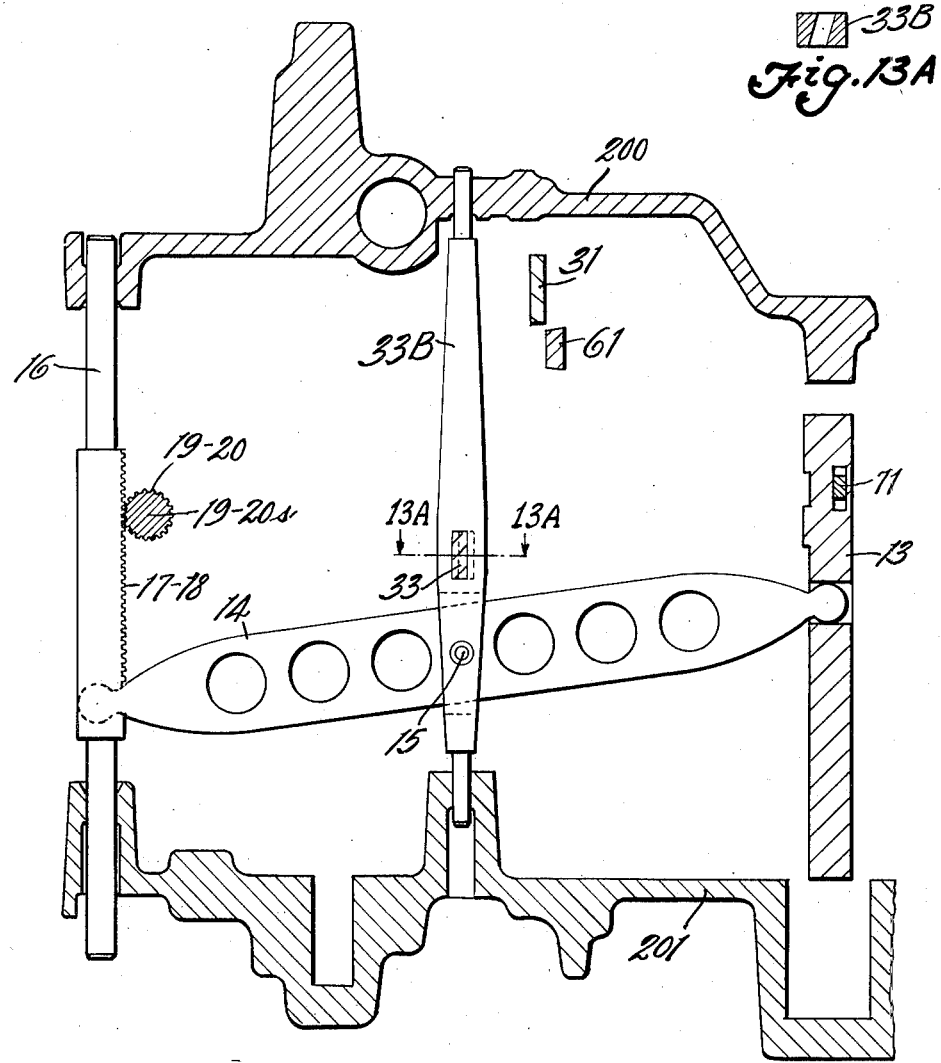

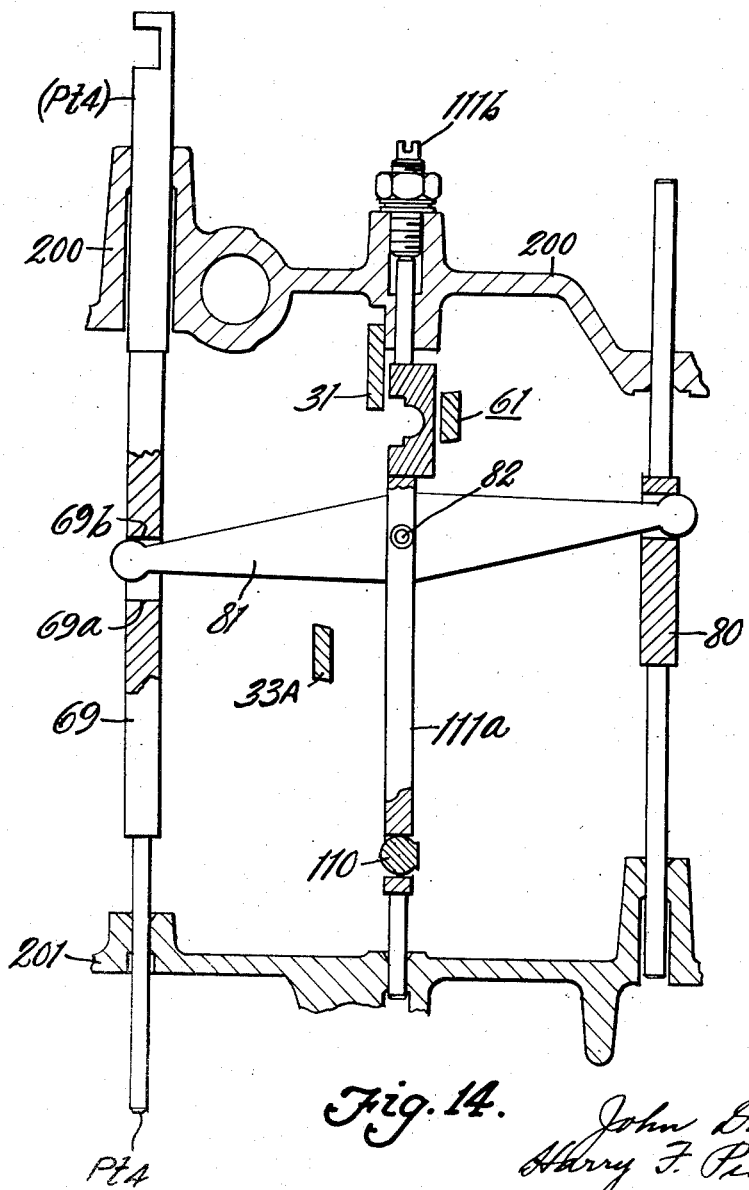

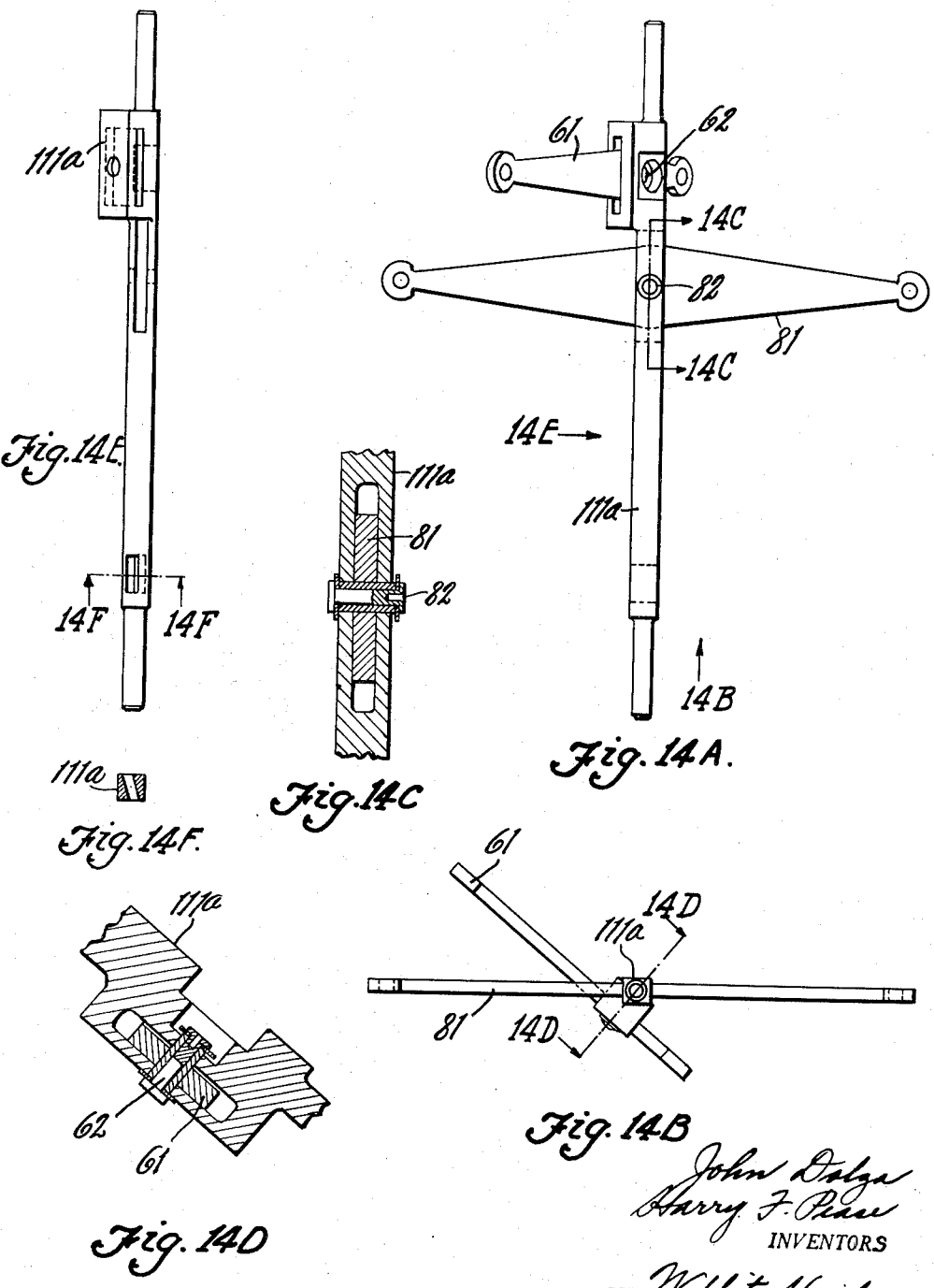

Jan. 29, 1957 J. DOLZA ET AL 2,779,422
ENGINE FUEL CONTROLLER
Filed Oct. 5, 1951 32 Sheets-Sheet 15

John Dolza
Harry F. Pierce
INVENTORS
BY Willits Hardman & Fehr
their attorneys

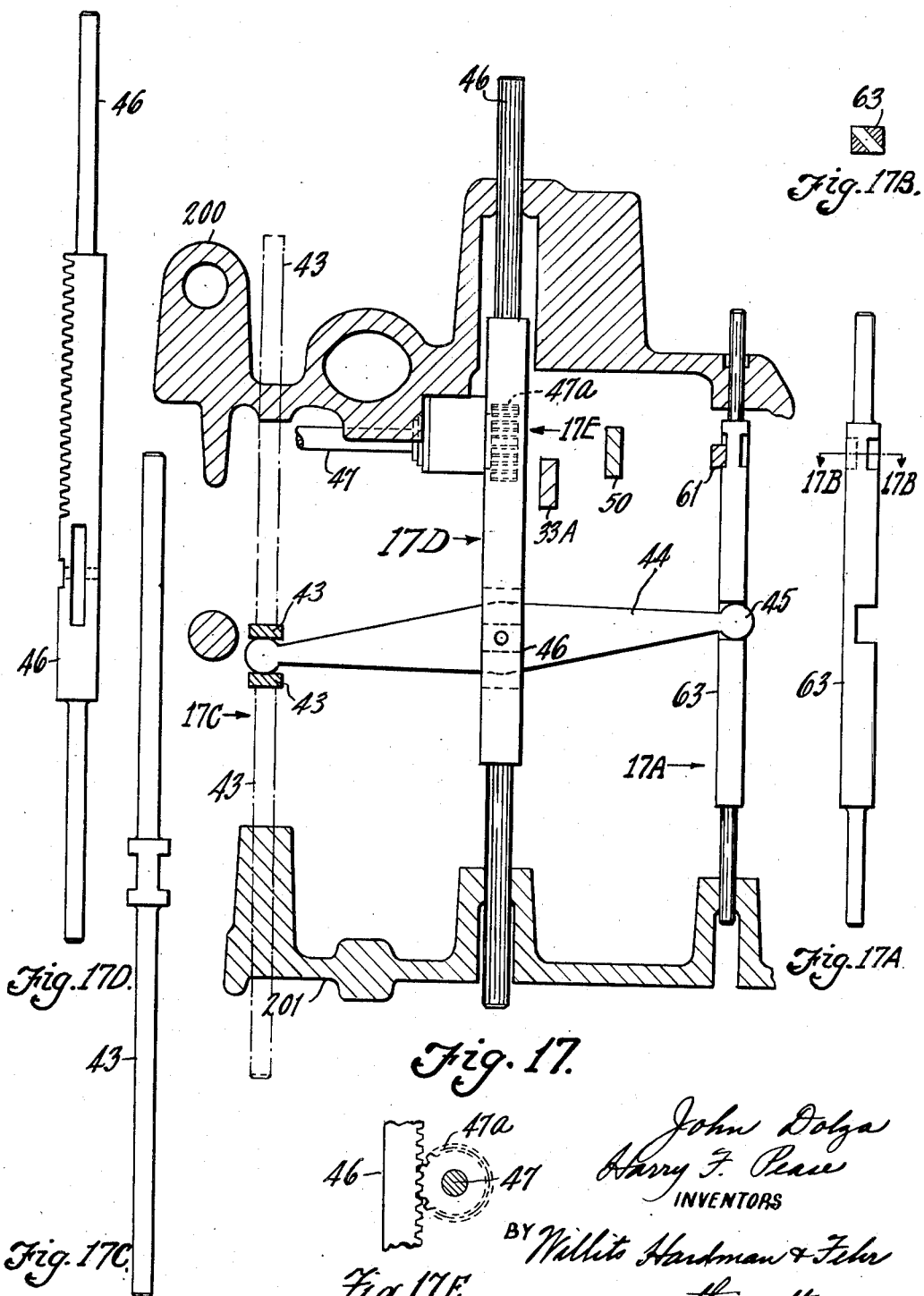

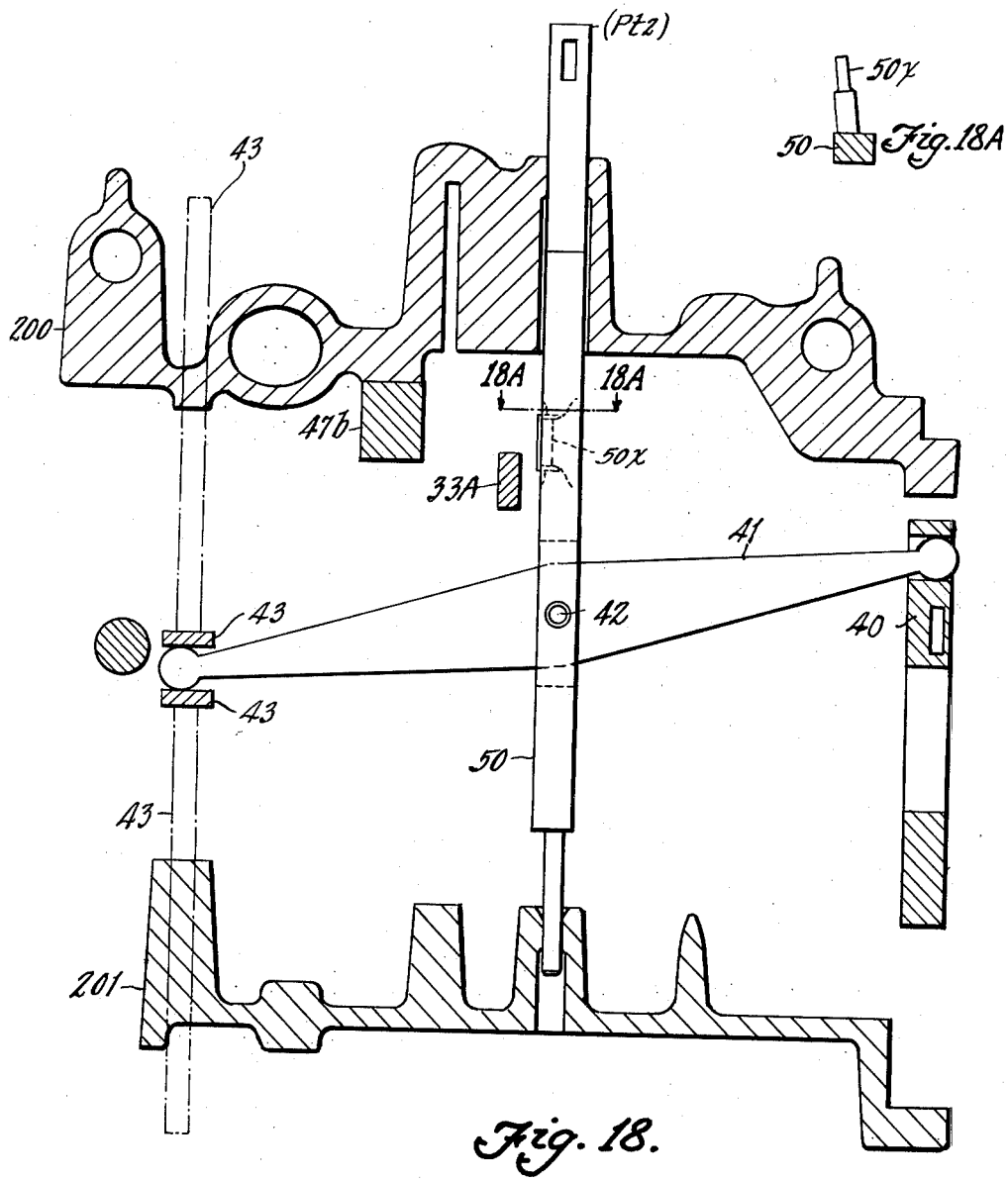

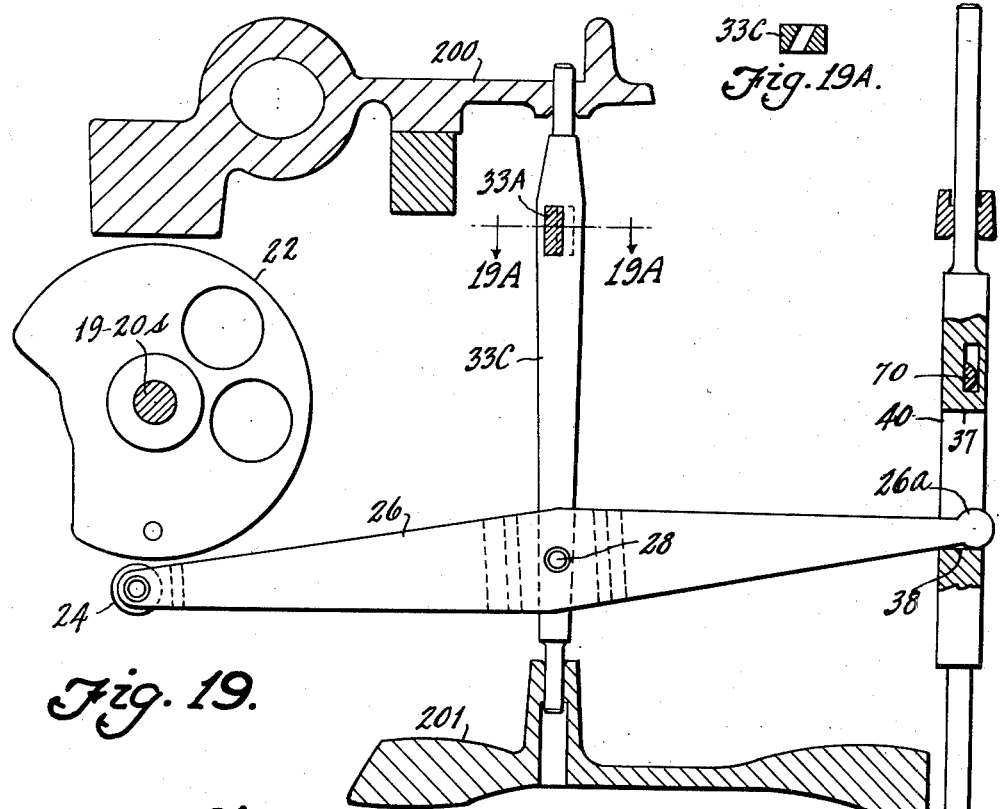
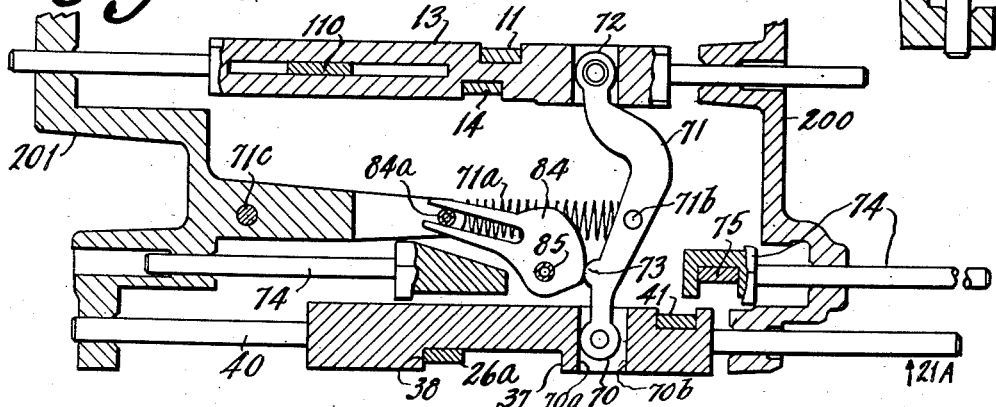
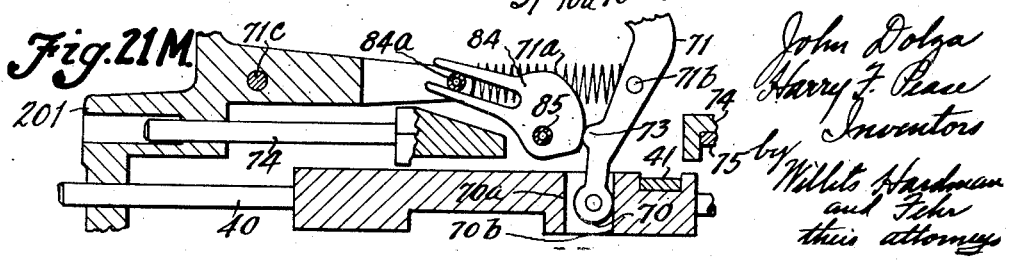

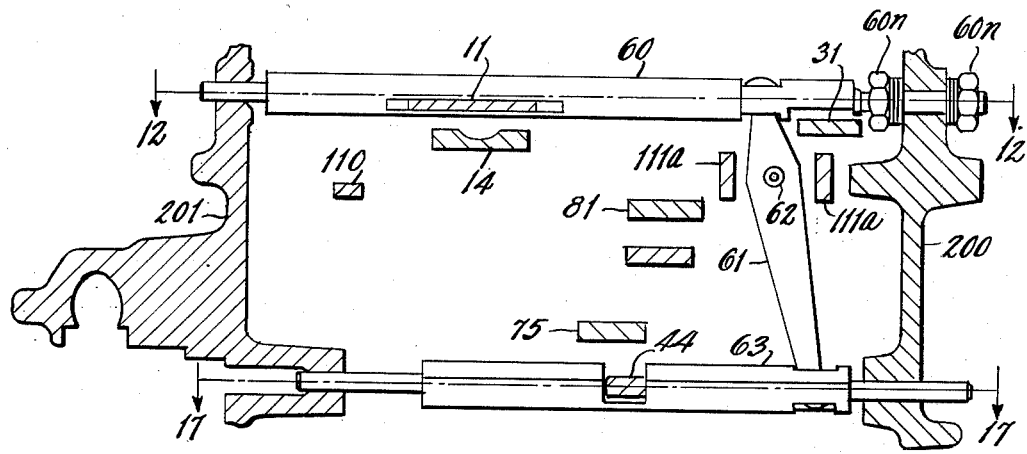
Fig. 22.
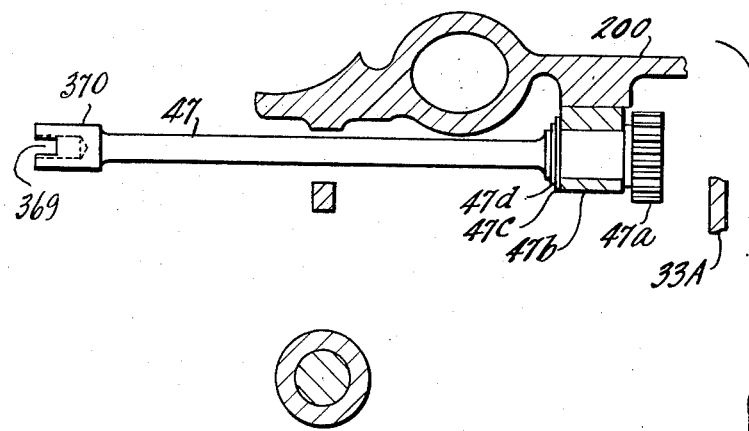
Fig. 20.
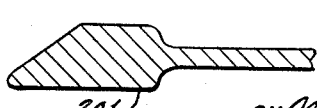

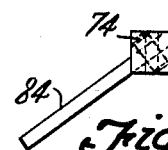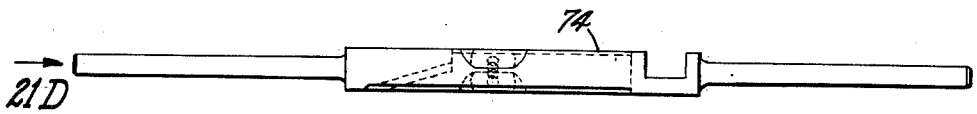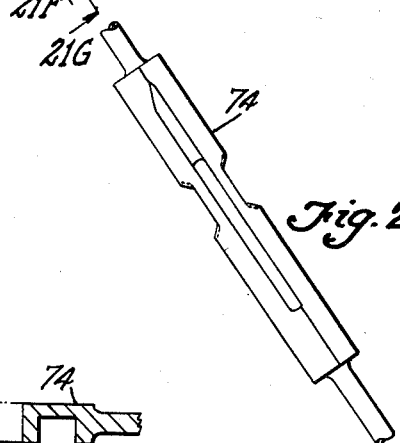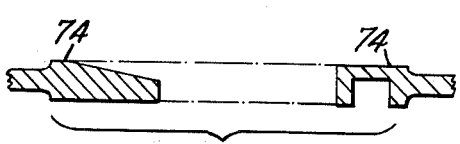

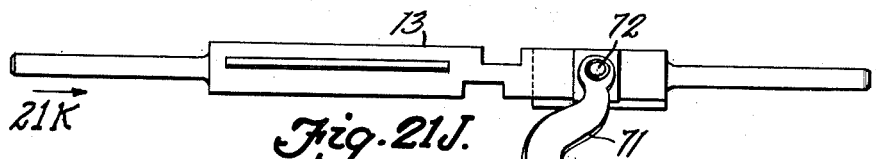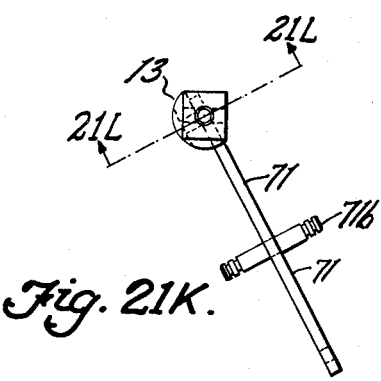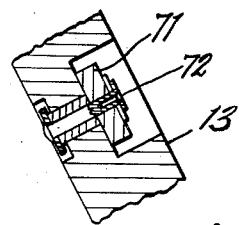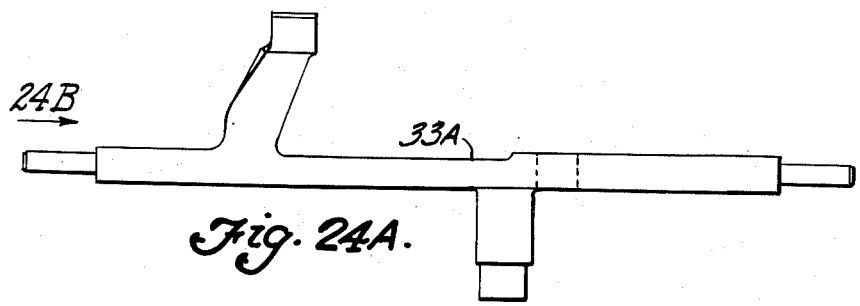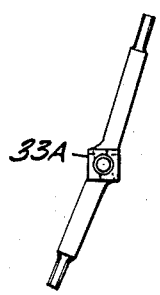

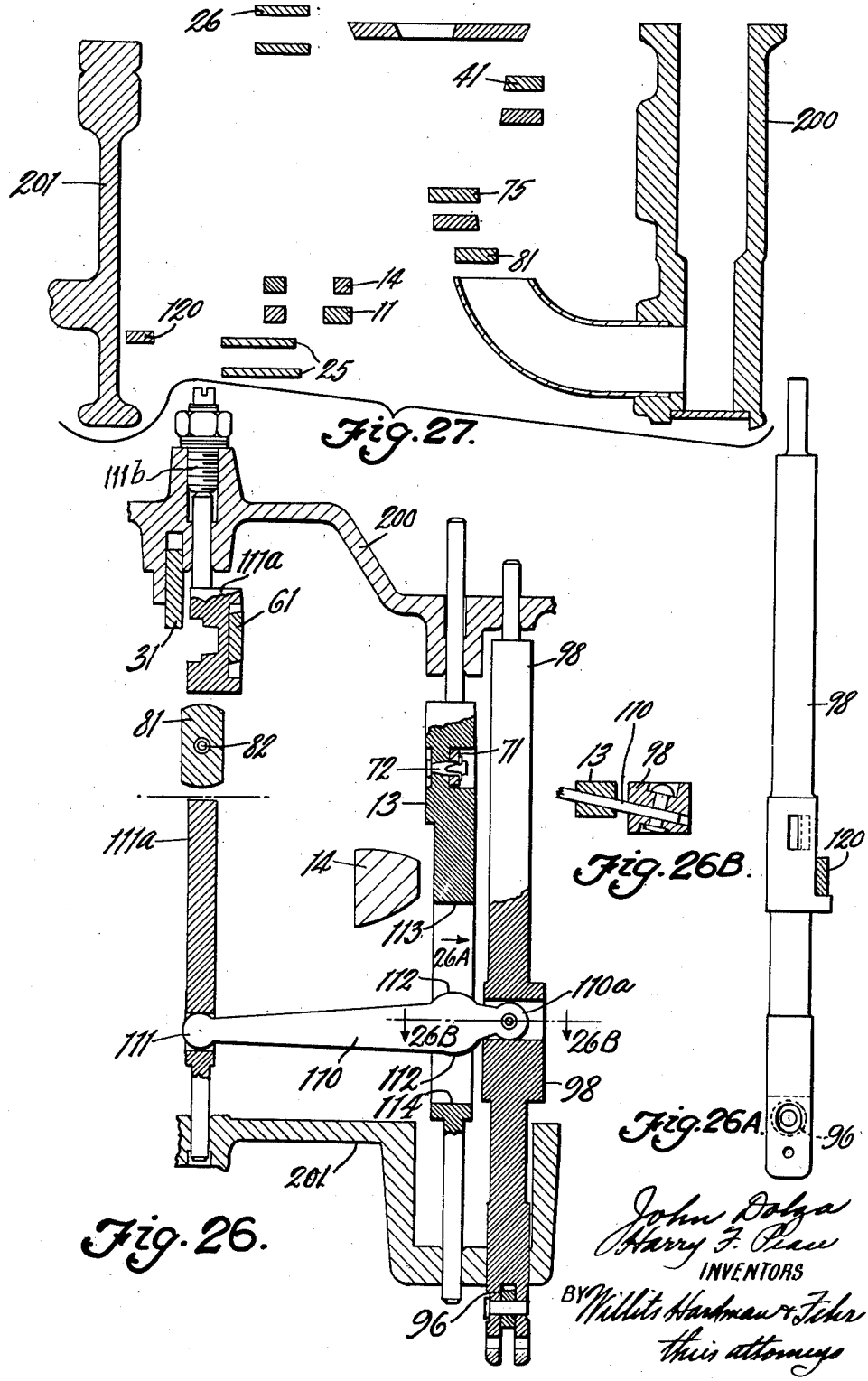

$\frac{1}{2} \log \delta$ $\delta = \dfrac{Pt_2}{29.92}$ (log Pt₄ abs.)

John Dolza
Harry F. Pease
INVENTORS

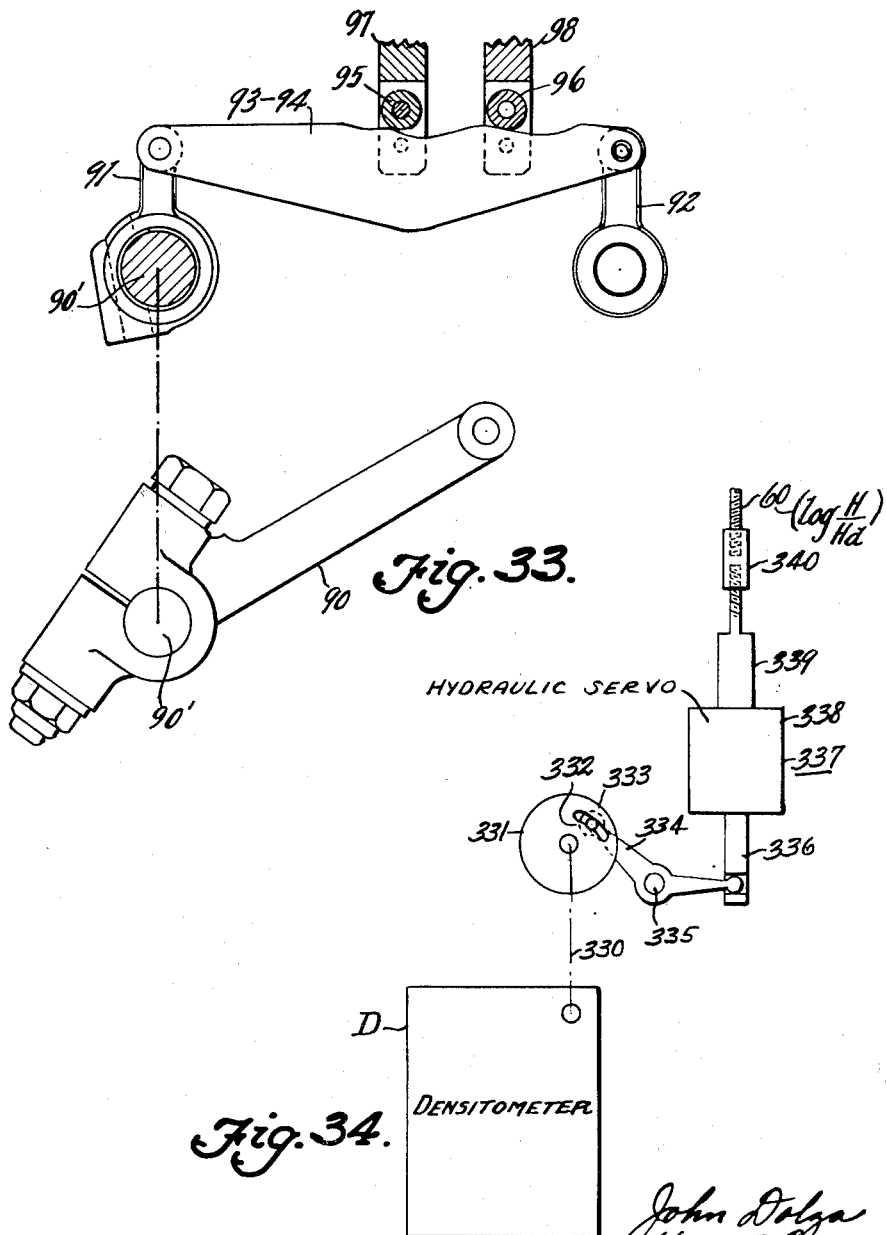

Jan. 29, 1957    J. DOLZA ET AL    2,779,422
ENGINE FUEL CONTROLLER
Filed Oct. 5, 1951    32 Sheets-Sheet 28
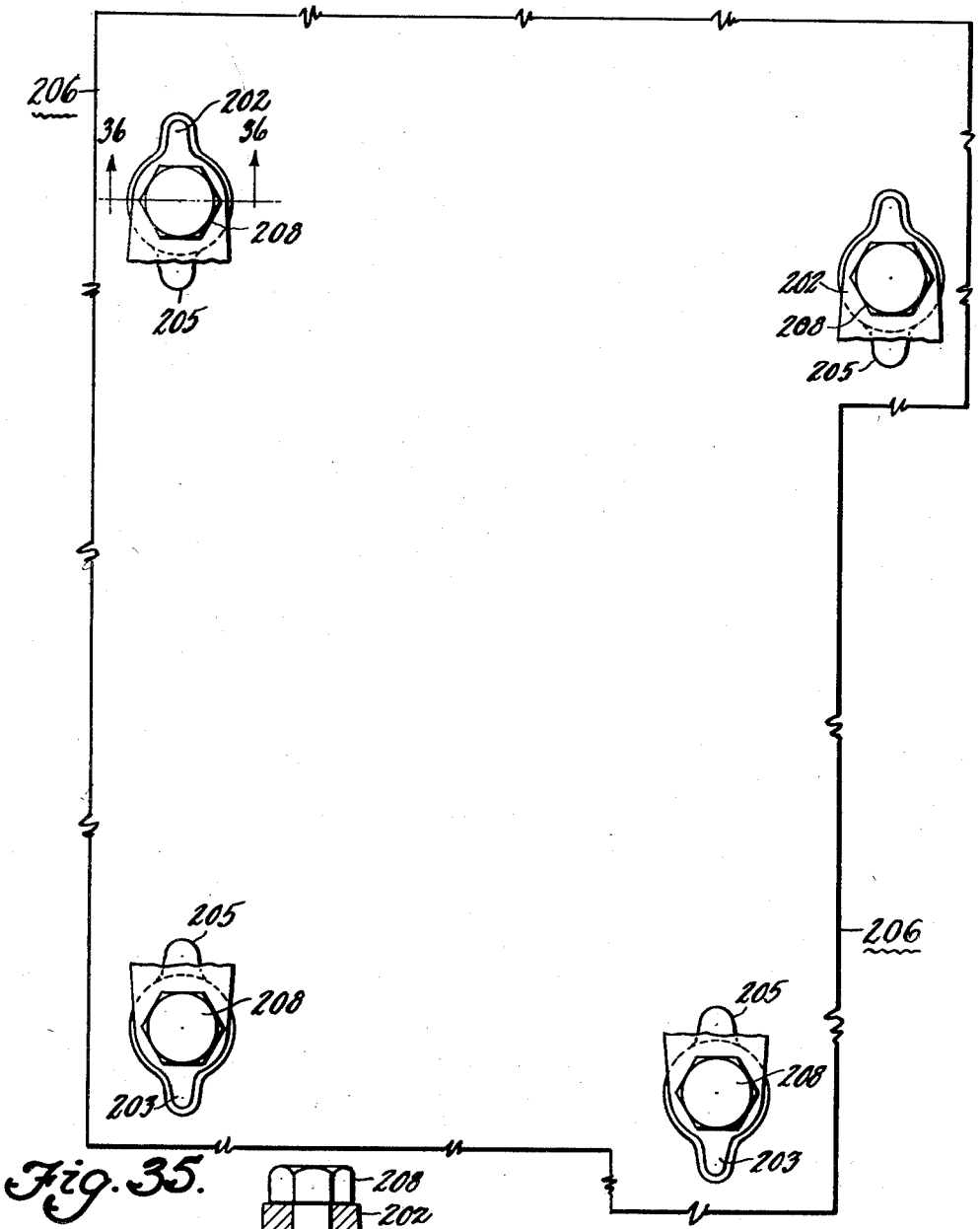
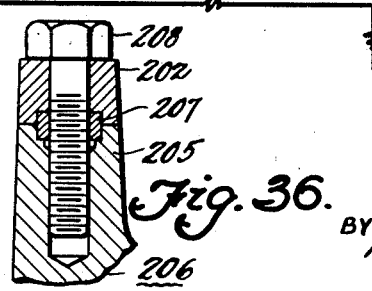
John Dolza
Harry F. Peau
INVENTORS
BY Willits Hardman & Fehr
their attorneys Jan. 29, 1957  J. DOLZA ET AL  2,779,422
ENGINE FUEL CONTROLLER
Filed Oct. 5, 1951  32 Sheets-Sheet 29
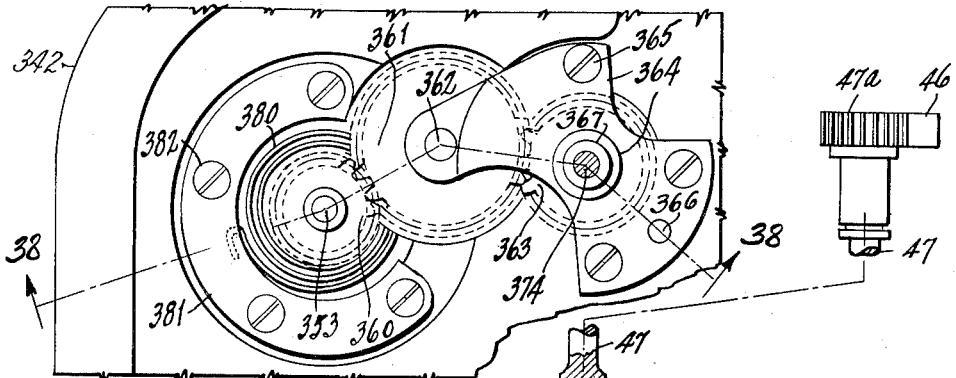
Fig. 37.
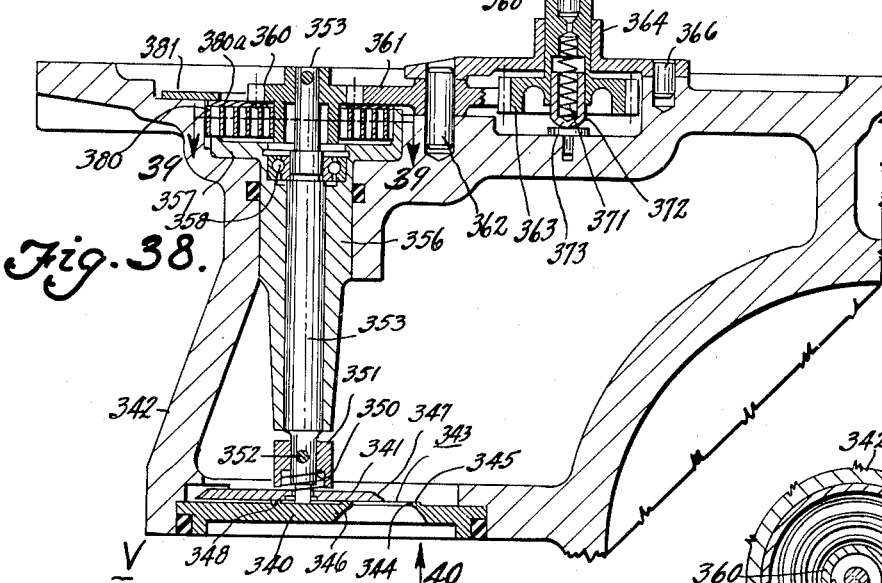
Fig. 38.
Fig. 39.
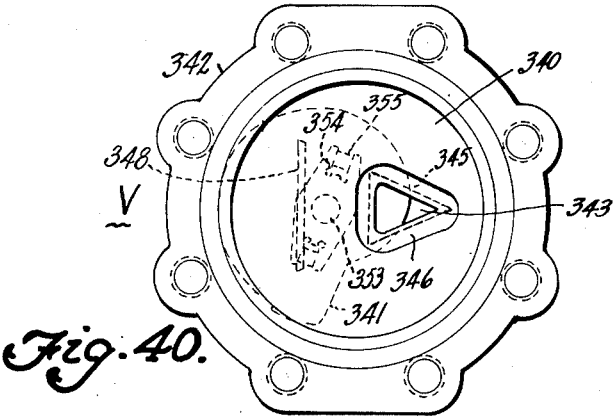
Fig. 40.
John Dolza
Harry F. Pease
INVENTORS
BY Willis Hardman & Fehr
their ATTORNEYS Jan. 29, 1957  J. DOLZA ET AL  2,779,422
ENGINE FUEL CONTROLLER
Filed Oct. 5, 1951  32 Sheets-Sheet 30

INVENTORS
John Dolza and Harry F. Pease
BY
Willits Hardman & Fehr
their ATTORNEYS

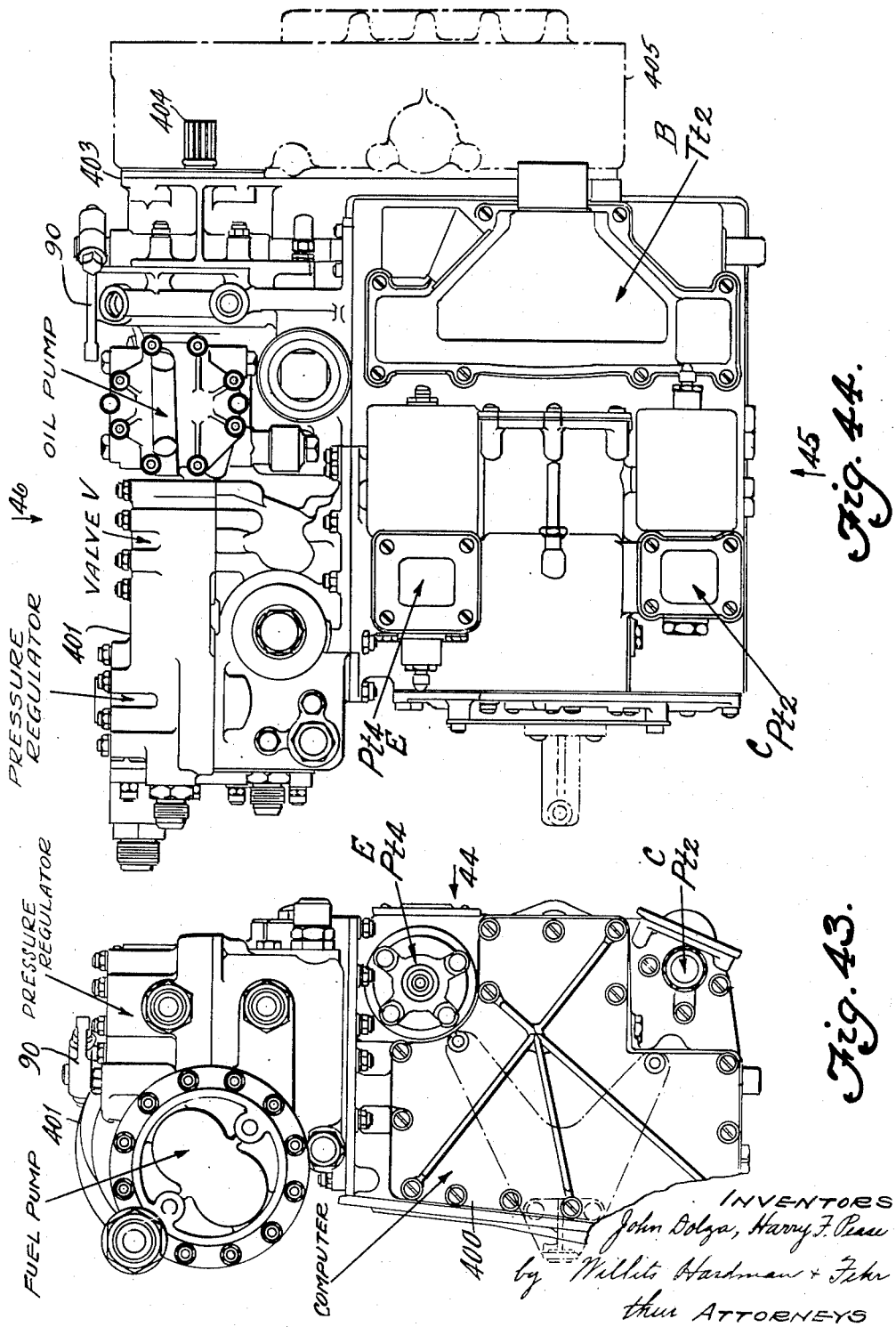

Jan. 29, 1957 J. DOLZA ET AL 2,779,422
ENGINE FUEL CONTROLLER
Filed Oct. 5, 1951 32 Sheets-Sheet 32
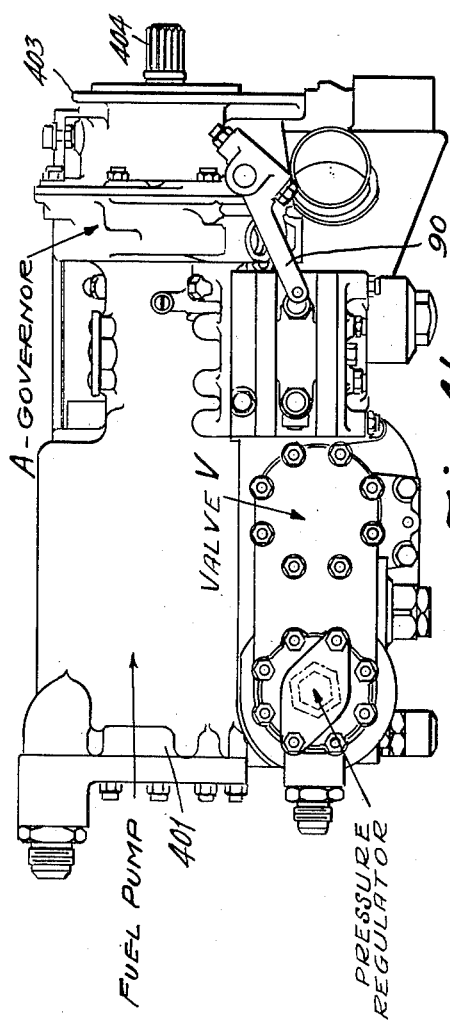
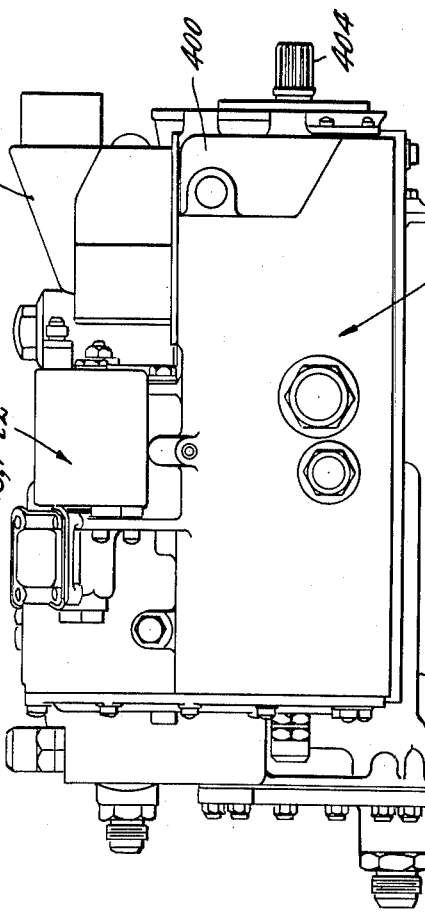
John Dolza
Harry F. Pease
INVENTORS
BY Willits Hardman
and Fehr
their ATTORNEYS United States Patent Office 2,779,422
Patented Jan. 29, 1957

2,779,422

ENGINE FUEL CONTROLLER

John Dolza, Davisburg, and Harry F. Pease, Ann Arbor, Mich., assignors to General Motors Corporation, Detroit, Mich., a corporation of Delaware Application October 5, 1951, Serial No. 249,999

14 Claims. (Cl. 170—135.74)

This invention relates to apparatus for controlling fuel flow to the burners of an internal combustion turbine engine which drives a propeller.

Objects of the invention are to control burner fuel flow in accordance with power demand as determined by the setting of the pilot's control lever and in accordance with other parameters which affect the operation of the engine whereby the engine will be operated most effectively and dangerous conditions of operation will be avoided. More particularly, objects of the invention are to provide for operation of the engine at the maximum permissible temperature, for operating at the speed selected by the pilot but no higher than a maximum value, for operation with the fuel required for maintaining a selected speed and in amount commensurate with fuel density but in amount such that danger of compressor surge will be avoided.

In the disclosed embodiment of the invention, these objects are accomplished by a computer which determines the setting of a fuel flow metering valve in a way which satisfies the conditions mentioned in the preceding paragraph. This computer is under control by the pilot who, by a control lever, imparts to the computer signals which are commensurate with the speed setting of the propeller blade pitch governor of the propeller driven by the engine and commensurate with a fuel rate setting related to speed setting according to a predetermined schedule. The computer is also under control by other sensing units measuring the variables from which fuel flow is determined. These sensing units respectively sense engine speed, compressor inlet air temperature, compressor inlet pressure, compressor outlet pressure and fuel density. The computer automatically calculates the fuel flow which is suitable for the conditions under which the engine is required to operate.

More particularly, the present invention includes the combination of a fuel metering valve having a movable orifice controlling member, a pilot's manually operated control lever, a propeller blade angle control device under control by the lever to maintain a selected speed in the positive thrust range or to obtain a desired blade angle in the negative thrust range, a mechanism under control by the lever to cause positioning of the orifice controlling member to maintain fuel flow sufficient for the selected speed, a compressor inlet temperature senser, an engine speed senser, a compressor inlet pressure senser and means under control by the sensers for effecting a modification of the action of said mechanism to obtain fuel flow no greater than required to obtain engine operation at a certain maximum turbine temperature.

In combination with the aforegoing combination of elements, the present invention provides means under control by the compressor inlet temperature senser and the engine speed senser for effecting a modification of the action of said mechanism for the purpose of reducing fuel flow to prevent surge.

A further modification of the action of said mechanism is provided by means under control by the engine speed senser for the purpose of reducing fuel flow when actual engine speed exceeds selected speed by an amount greater than a predetermined value.

Another modification of the action of said mechanism is obtained by means under control by the speed senser for effecting a movement for the purpose of rendering the fuel burner ignition operative when actual engine speed is more than a predetermined amount less than the demanded engine speed.

The present invention provides also means rendered operative by the control lever, when shifted into such position that the propeller pitch control is conditioned for negative blade pitch, for conditioning the mechanism for control of engine fuel by the engine speed senser in order to maintain engine speed required for the negative thrust regime.

Another modification of the action of said mechanism is provided by a means under control by the compressor inlet pressure senser and the compressor outlet pressure senser for effecting reduction of fuel flow when compressor outlet pressure is below a certain standard value with respect to compressor inlet pressure. In this connection, the invention provides means for preventing operation of said flow reducing means when the mechanism is in operation idle status.

Further objects and advantages of the present invention will be apparent from the following description, reference being had to the accompanying drawings wherein a preferred embodiment of the present invention is clearly shown.

In the drawings:

Fig. 1 is a diagram of a computer. Fig. 1A is an operation chart.

Figs. 2 and 2A form a side view of the computer.

Figs. 3 and 4 are plan views of parts 200 and 201 as viewed in the direction of arrows 3 and 4, respectively, of Fig. 2.

Fig. 5 is a view in the direction of arrow 5 of Fig. 2.

Fig. 5A is a fragmentary sectional view on line 5A—5A of Fig. 5.

Fig. 5B is a view of strap shown in Figs. 9 and 9A before being wrapped around shaft 19—20s.

Fig. 6 is a view in the direction of arrow 6 of Fig. 2.

Fig. 6A is a sectional view on line 6A—6A of Fig. 6.

Fig. 7 is a sectional view of the computer taken on line 7—7 of Fig. 3.

Fig. 8 is a sectional view of the computer assembly on line 8—8 of Fig. 3.

Fig. 8A is a view in the direction of arrow 8A of Fig. 8.

Fig. 8B is a view in the direction of arrow 8B of Fig. 8.

Fig. 8C, on the following sheet, is an enlarged fragmentary sectional view on line 8C—8C of Fig. 8A.

Figure 3:
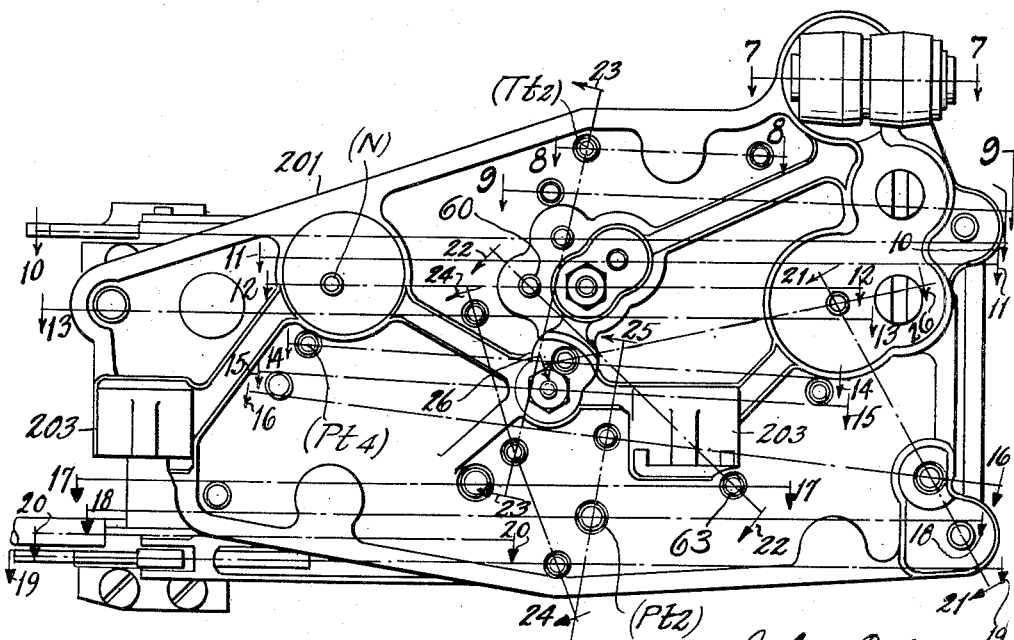

Fig. 9 is a sectional view of the computer assembly on line 9—9 of Fig. 3.

Fig. 9A is a view of part 97 in the direction of arrow 9A of Fig. 9.

Fig. 9B is a sectional view on line 9B—9B of Fig. 9A.

Fig. 9C is a sectional view on line 9C—9C of Fig. 9.

Fig. 9D is a side view of an assembly of parts including 102 and 103b.

Fig. 9E is an edge view partly in section on line 9E—9E of Fig. 9D.

Fig. 9F is a view of part 101 shown in Fig. 9.

Fig. 9G is a sectional view on line 9G—9G of Fig. 9F.

Fig. 10 is a sectional view of the computer assembly on line D—D of Fig. 3.

Fig. 10A is a sectional view on line 10A—10A of Fig. 10.

Fig. 10B is a view of part 25 in the direction of arrow 10B of Fig. 10.

Fig. 11 is a sectional view of the computer assembly on line 11—11 of Fig. 3.

Fig. 11A is a view of rod 122 in the direction of arrow 11A of Fig. 11.

Fig. 12 is a sectional view of the computer assembly on line 12—12 of Fig. 3.

Fig. 12A is a view of rod 10 in the direction of arrow 12A of Fig. 12.

Fig. 12B is a view in the direction of arrow 12B of Fig. 12A.

Fig. 12C is a view of rod 60 in the direction of arrow 12C of Fig. 12.

Fig. 12D is a view in the direction of arrow 12D of Fig. 12C.

Fig. 12E is a sectional view on line 12E—12E of Fig. 12C.

Fig. 13 is a sectional view of the computer assembly on line 13—13 of Fig. 3.

Fig. 13A is a sectional view on line 13A—13A of Fig. 13.

Fig. 14 is a sectional view of the computer assembly on line 14—14 of Fig. 3.

Fig. 14A is an assembly of parts 11A, 81 and 61.

Fig. 14B is a view in the direction of arrow 14B of Fig. 14A.

Fig. 14C is an enlarged sectional view on line 14C—14C of Fig. 14A.

Fig. 14D is an enlarged sectional view on line 14D—14D of Fig. 14B.

Fig. 14E is a view of rod 111A in the direction of arrow 14E of Fig. 14A.

Fig. 14F is a sectional view on line 14F—14F of Fig. 14E.

Figures 15, 15A, 15C:
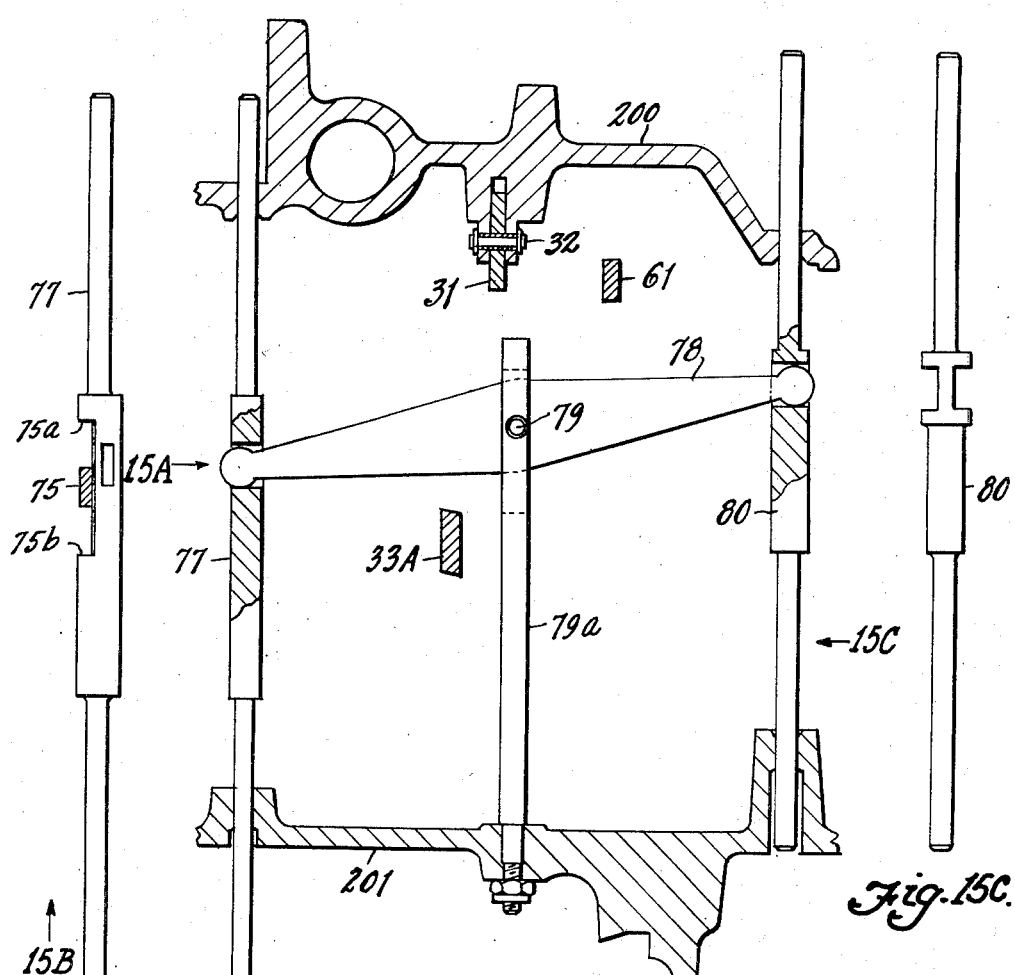

Fig. 15 is a sectional view of the computer assembly on line 15—15 of Fig. 3.

Fig. 15A is a view of rod 77 in the direction of arrow 15A of Fig. 15.

Figure 15B:

Fig. 15B is a view in the direction of arrow 15B of Fig. 15A.

Fig. 15C is a view of rod 80 in the direction of arrow 15C of Fig. 15.

Figure 16:
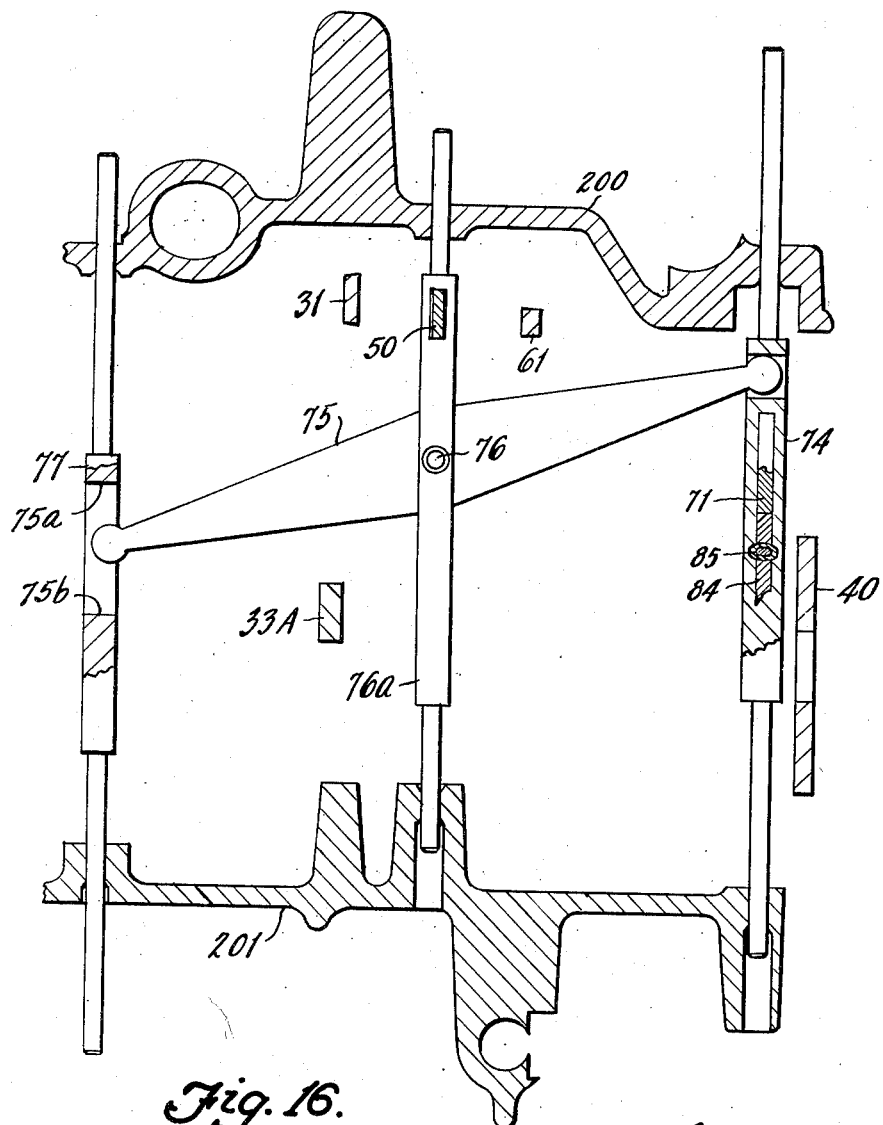

Fig. 16 is a sectional view of the computer assembly on line 16—16 of Fig. 3.

Fig. 17 is a sectional view of the computer assembly on line 17—17 of Fig. 3.

Fig. 17A is a view of rod 63 in the direction of arrow 17A of Fig. 17.

Fig. 17B is a sectional view on line 17B—17B of Fig. 17A.

Fig. 17C is a view of rod 43 in the direction of arrow 17C of Fig. 17.

Fig. 17D is a view of rod 46 in the direction of arrow 17D of Fig. 17.

Fig. 17E is a view in the direction of arrow 17E showing gear 47a in mesh with a rack of rod 46.

Fig. 18 is a sectional view of the computer assembly on line 18—18 of Fig. 3.

Fig. 18A is a sectional view on line 18A—18A of Fig. 18.

Fig. 19 is a sectional view of the computer assembly on line 19—19 of Fig. 3.

Fig. 19A is a sectional view on line 19A—19A of Fig. 19.

Fig. 20, on the following sheet, is a sectional view of the computer assembly on line 20—20 of Fig. 3.

Fig. 21, on same sheet with Fig. 19, is a sectional view of the computer assembly on line 21—21 of Fig. 3.

Fig. 21A is a view in the direction of arrow 21A of Fig. 21 showing the assembly of parts 74 and 84.

Figs. 21B and 21C are, respectively, views in the direction of arrows 21B and 21C of Fig. 21A.

Fig. 21D is a view in the direction of arrow 21D of Fig. 21B.

Figs. 21E and 21F are, respectively, fragmentary views in the direction of arrows 21E and 21F of Fig. 21D.

Fig. 21G is a sectional view on line 21G—21G of Fig. 21D.

Fig. 21J is a view of the assembly of parts 13 and 71.

Fig. 21K is a view in the direction of arrow 21K of Fig. 21J.

Fig. 21L is an enlarged sectional view on line 21L—21L of Fig. 21K.

Fig. 21M, on same sheet with Fig. 21, is a sectional view showing parts of Fig. 21 in different positions.

Fig. 22, on the same sheet with Fig. 20, is a sectional view on line 22—22 of Fig. 3.

Figure 23:
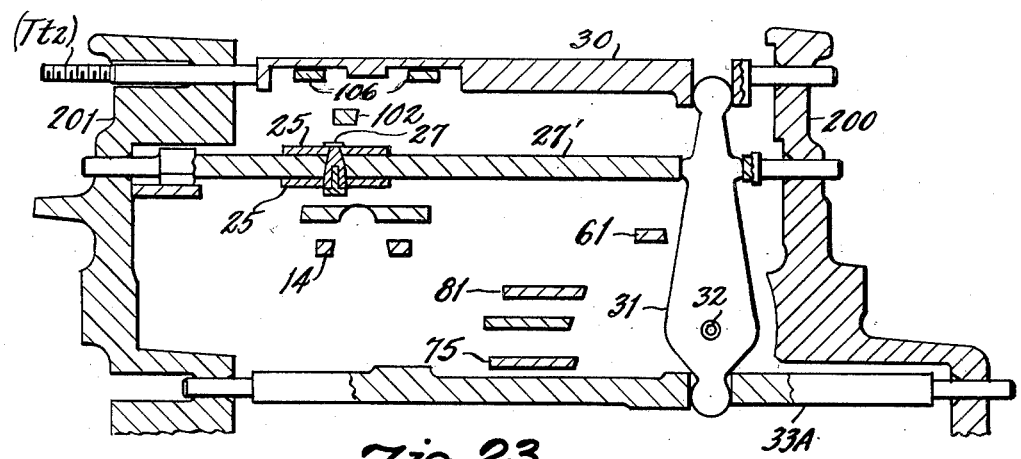
Figure 24:
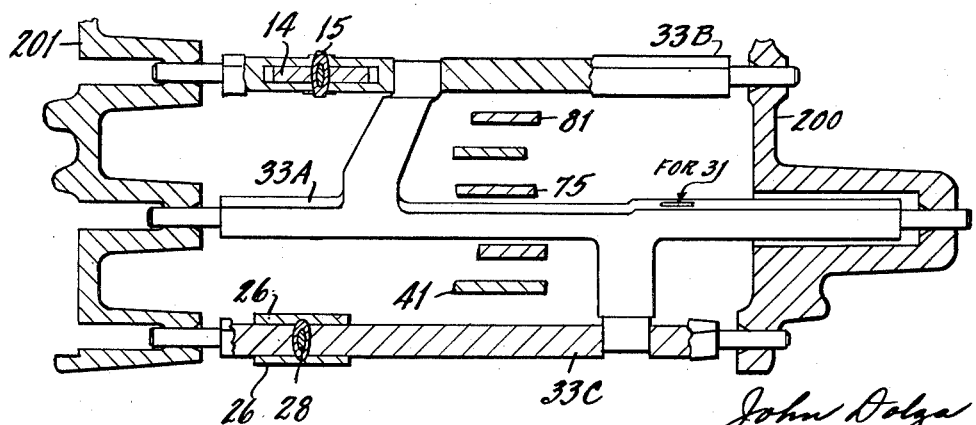

Figs. 23 and 24 are, respectively, sectional views of the computer assembly on lines 23—23 and 24—24 of Fig. 3.

Fig. 24A is a view of rod 33A.

Fig. 24B is a view in the direction of arrow 24B of Fig. 24A.

Figure 25:
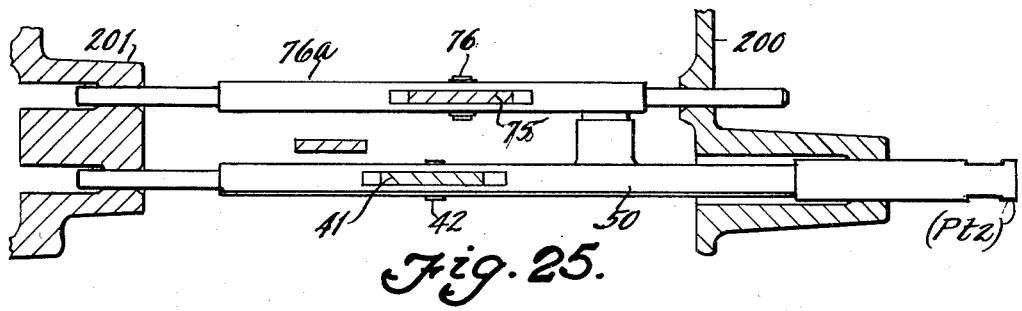

Figs. 25 and 26 are, respectively, sectional views on lines 25—25 and 26—26 of Fig. 3.

Fig. 26A is a view of rod 98 in the direction of arrow 26A of Fig. 26.

Fig. 26B is a sectional view on line 26B—26B of Fig. 26.

Figure 4:
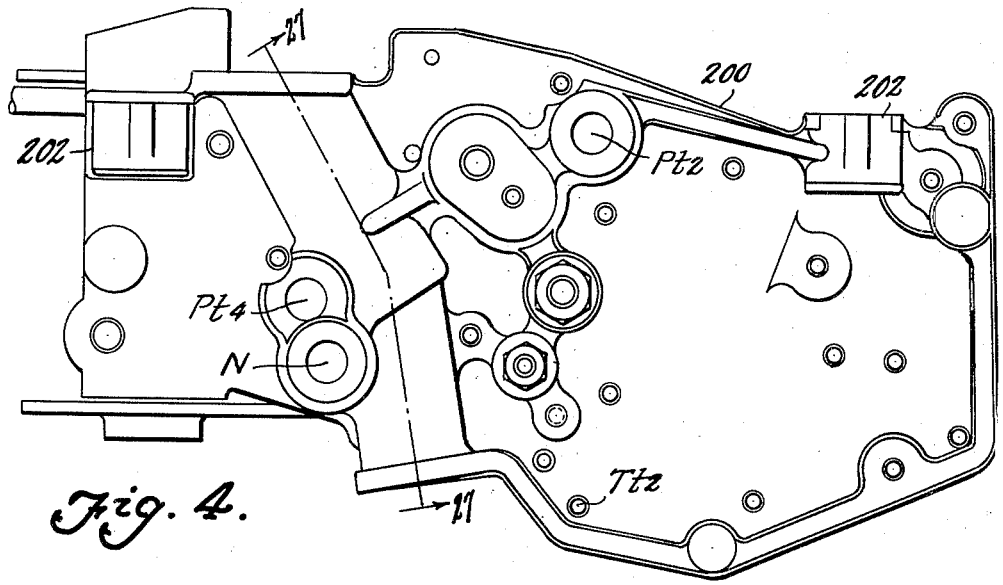

Fig. 27 is a sectional view of the computer assembly on line 27—27 of Fig. 4.

Figure 1:
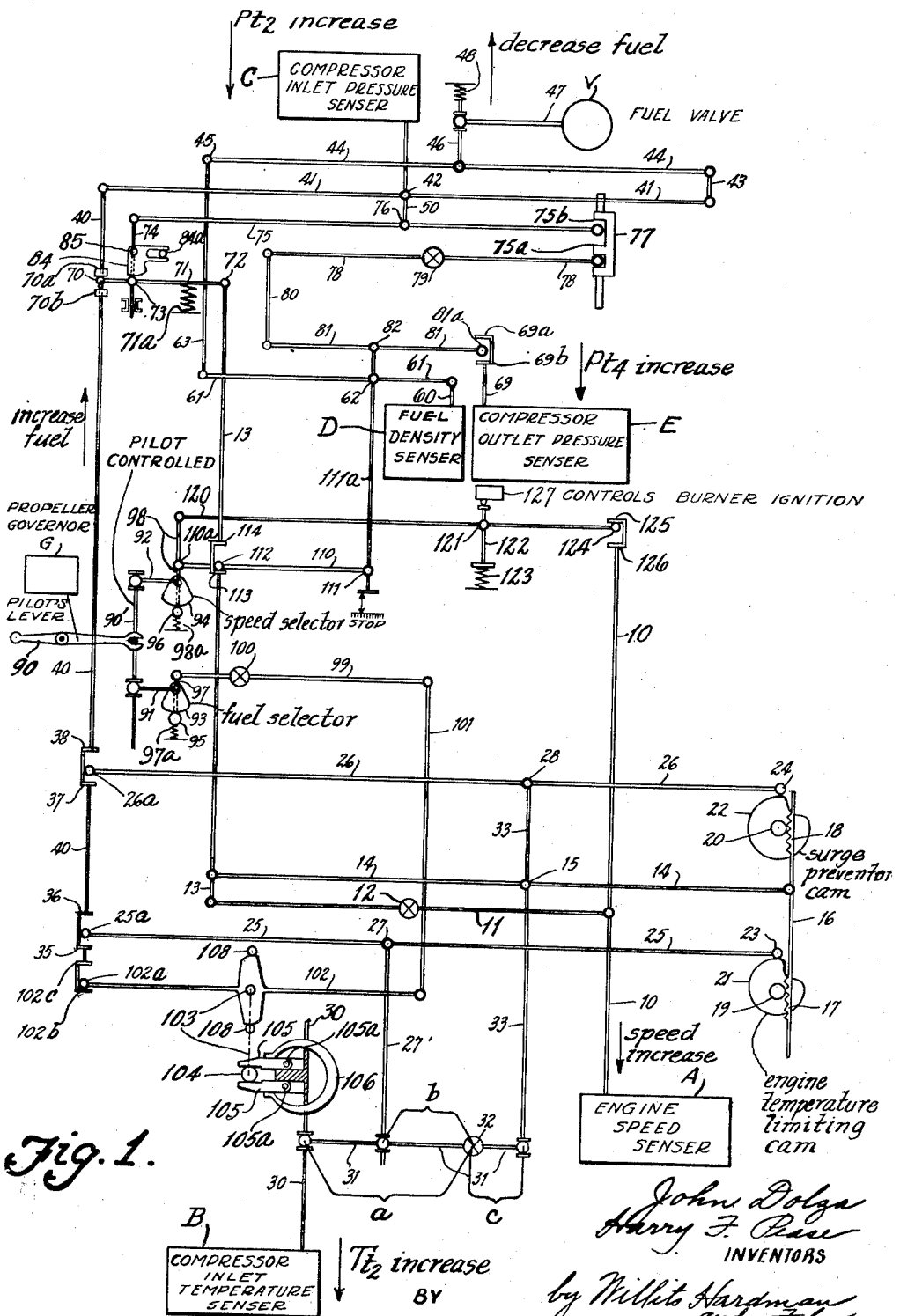
Figure 28:
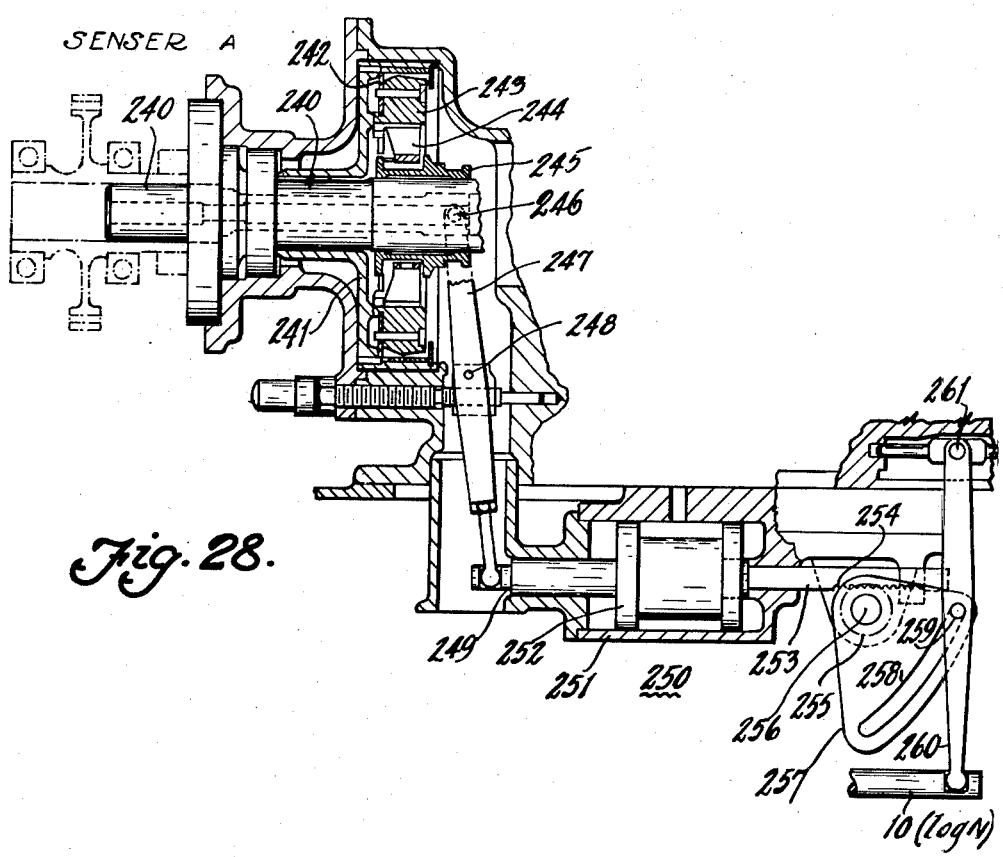

Fig. 28 is a view partly in longitudinal section of the engine speed senser A of Fig. 1.

Figure 29:
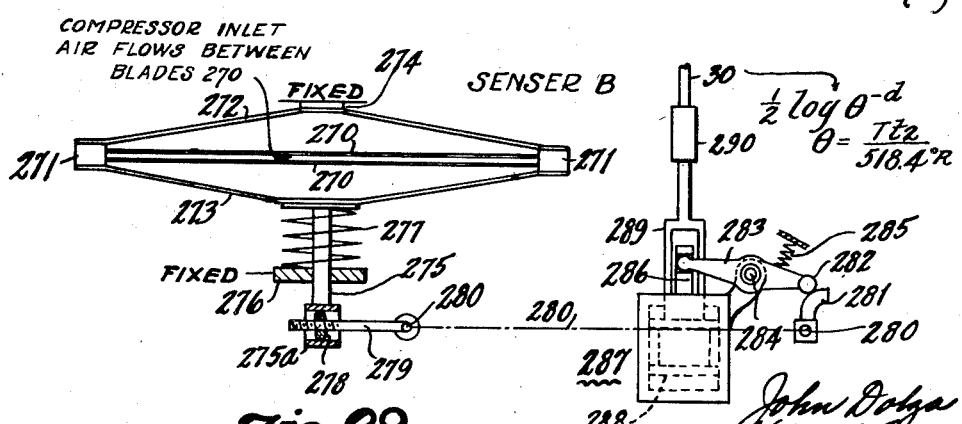

Fig. 29 is a diagram of the compressor inlet temperature senser B of Fig. 1.

Figure 30:
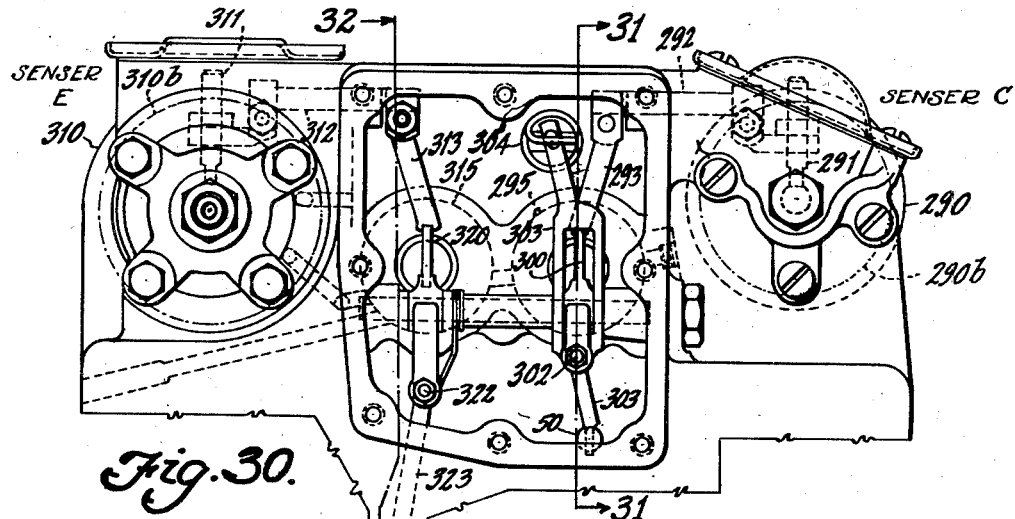

Fig. 30 is a view of apparatus which includes the compressor inlet pressure senser C and compressor outlet senser E of Fig. 1.

Figure 31:
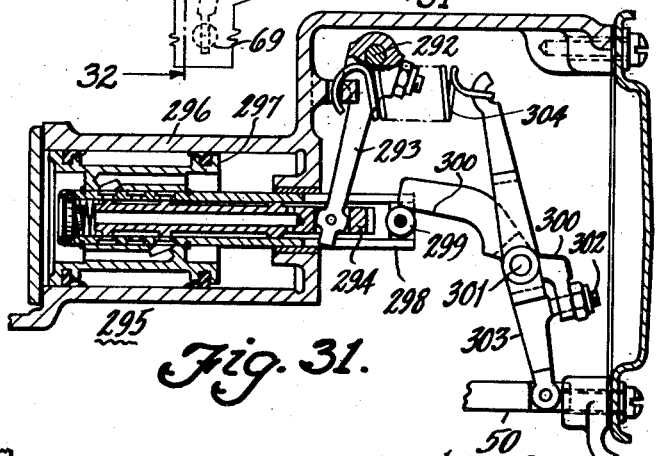
Figure 32:
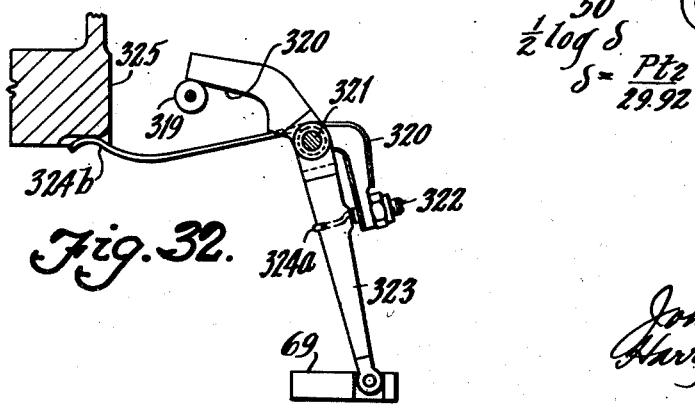

Figs. 31 and 32 are, respectively, fragmentary sectional views on lines 31—31 and 32—32 of Fig. 30.

Fig. 33 is a diagram showing the control of a cam blade 93—94 by pilot operated lever 90.

Fig. 34 is a diagram of fuel density senser D of Fig. 1 and its connections with rod 60.

Fig. 35 is a view of a fragment of the computer housing together with parts of the computer heads which are attached thereto.

Fig. 36 is a fragmentary sectional view on line 36—36 of Fig. 35.

Fig. 37 is a plan view of mechanism for operating valve V of Fig. 1.

Fig. 38 is a sectional view on line 38—38 of Fig. 39.

Fig. 39 is a sectional view on line 39—39 of Fig. 38.

Fig. 40 is a view in the direction of arrow 40 of Fig. 38.

Figures 41, 42:
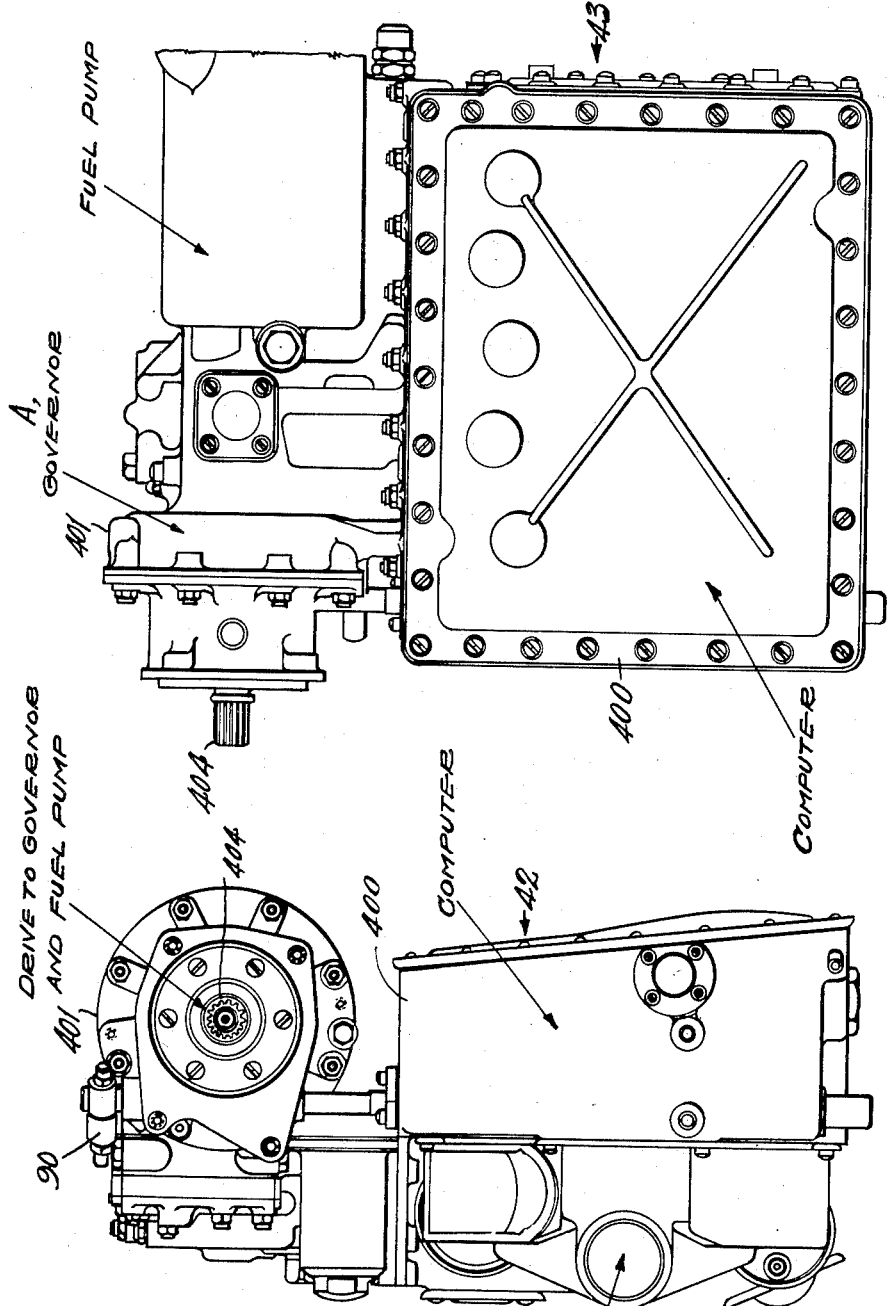

Fig. 41 is the front end view of an assembly which includes the apparatuses represented in Fig. 1.

Fig. 42 is the top view of the assembly looking in the direction of arrow 42 of Fig. 41.

Fig. 43 is the rear end view of the assembly looking in the direction of arrow 43 of Fig. 42.

Fig. 44 is the bottom view of the assembly looking in the direction of arrow 44 of Fig. 43.

Figs. 45 and 46 are views respectively in the directions of arrows 45 and 46 of Fig. 44.

In Fig. 1, which represents diagrammatically the computer assembly, details of which are shown in the other figures, the parts which appear vertically are generally rods and the parts which appear horizontally are generally levers. Some of the levers appear to have unequal arms in order that parts on the diagram may be spaced for clarity. Actually, some of these levers have arms of equal length, as, for example, lever 102 shown in Fig. 9, lever 25 (Fig. 10), lever 120 (Fig. 11), lever 11 (Fig. 12), lever 14 (Fig. 13), lever 81 (Fig. 14), lever 78 (Fig. 15), lever 75 (Fig. 16), lever 44 (Fig. 17), lever 41 (Fig. 18), lever 26 (Fig. 19).

Referring to Fig. 1, rod 10, operated by engine speed senser A, moves up for speed decrease and down for speed increase. Rod 10 is connected with a lever 11 pivoted at 12 and connected by a rod 13 with a lever 14 pivoted on a floating fulcrum 15 and connected with a bar 16 which provides racks 17 and 18 meshing, respectively, with gears 19 and 20 which drive cams 21 and 22, respectively, engaged by rollers 23 and 24 respectively, attached to levers 25 and 26, respectively, pivoted on floating fulcrums 27 and 28, respectively.

Rod 30, operated by compressor inlet temperature sensor B, moves down with temperature increase and up with temperature decrease. Rod 30 is connected with a lever 31 pivoted at 32 and connected to rod 33 which carries floating fulcrums 15 and 28.

Lever ends 25a and 26a are located respectively between shoulders 35, 36 and shoulders 37, 38 of a rod 40.

Rod 40 is connected with a lever 41 pivoted on a floating fulcrum 42 and connected by a link 43 with a lever 44 pivoted on a floating fulcrum 45 and connected with a rod 46 connected with a lever 47 of a fuel flow-metering valve V and urged counterclockwise by a spring 48 which tends to increase the area of the flow-metering orifice of valve V.

As speed increases, cam 21 rotates clockwise to permit roller 23 to lower, lever end 25a to rise, rod 40 to rise, rod 46 to lower to increase fuel.

As compressor inlet temperature $T_{t2}$ increases, cam 21 rotates counterclockwise to cause 23 to rise end 25a to lower, rod 40 to lower, rod 46 to rise to decrease fuel.

The following nomenclature applies in the calculations which follow:

$N$ = turbine speed.
$\theta$ = relation of absolute temperature at the compressor inlet to a standard absolute temperature which, for example, is $$59° \text{ F.} + 459.4 = 518.4° \text{ R.} \quad \theta = \frac{Tt}{518.4}$$

$\delta$ is the relation of absolute pressure $Pt2$ at the compressor inlet in inches Hg, to sea level pressure.

$$\delta = \frac{Pt2}{29.92}$$

Rod 30, actuated by compressor inlet temperature sensor B, moves according to ½ log $\theta^{-d}$. Exponent $d$ will be explained later. Where compressor inlet temperature $Tt2$ increases, rod 33 moves up. The ratio of arms $a$ and $c$ of lever 31 is such that rod 33 moves according to ¼ log $\theta$. When rod 33 moves up, rod 16 moves up according to $$2 \text{ times } \tfrac{1}{4} \log \theta = \tfrac{1}{2} \log = \log\sqrt{\theta}$$

Rod 10, actuated by engine speed senser A, moves down with speed increase according to log $N$. Rod 16 is moved down by rod 10 according to log $N$. The resultant of the movements imparted to rod 16 by rod 10 and rod 33 is $$\log N - \log\sqrt{\theta} = \log\frac{N}{\sqrt{\theta}}$$

Cam 21 has a contour determined by distances on radial lines. The radial lines are positioned angularly with respect to a starting line according to $$\frac{N}{\sqrt{\theta}}$$

taking into account the change angular position of lever 25 as cam 21 rotates. The radial distances are such as to give a contour which will result in such fuel flow to the burners that turbine temperature, $Tt5$, of a certain value, will be attained, but not exceeded, for all values of $$\frac{N}{\sqrt{\theta}}$$

as determined by test data for a particular engine.

In Fig. 1A, curve I is based on values of $$\frac{N}{\sqrt{\theta}}$$

on base lines O—X and values of $$\frac{Wf}{\delta\sqrt{\theta}}$$

along line O—Y which represent those fuel requirements at different speeds necessary for the turbine temperature, $Tt5$, of a particular engine to attain a certain maximum safe value, such as 2160° R. $Wf$ means weight of fuel per unit of time. Curve I (Fig. 1A) is for engine operation where $\delta$ and $\theta$ are equal to 1.

Since the contour of cam 21 corresponds to curve I (Fig. 1A) and cam 21 is rotated according to log $$\frac{N}{\sqrt{\theta}}$$

the distances along radial lines are such that lever end 25a is moved by cam 21 according to log $$\frac{Wf}{\delta\sqrt{\theta}}$$

Since compressor inlet temperature may vary it is necessary to take into account deviations of $\theta$ from 1. For this purpose, the pivot 27 of lever 25 is supported by a vertically movable rod 27' connected with the lever 31, the left end of which is moved according to ½ log $\theta^{-d}$. The relation of lever arms $a$ and $b$ is such that rod 27' moves according to a certain function of $\theta$ which is ½ log $\theta^{-D}$. Exponent D (for example 1.337) is a value such that, within certain limits of compressor inlet temperature change, the deviation of $\theta$ from 1 is for all practical purposes compensated for, so that movement of lever end 25a is in accordance with $$\log\frac{Wf}{\delta}$$

This means that rod 40, which is biased up in Fig. 1 by spring 48, is allowed to move up to the extent that lever end 25a moves up in accordance with control by cam 21 and by the temperature senser B acting through the lever pivot 27. Therefore, unless upward movement of rod 40 is otherwise prevented, the fuel which passes to the burners is such that actual turbine temperature, $Tt5$, will be as much as but not greater than the maximum safe value, for example, 2160° R., for all values of $$\frac{N}{\sqrt{\theta}}$$

notwithstanding deviation of $\theta$ from 1, as compressor inlet temperature varies in the range of −65° F. to +165° F.

The surge preventing cam 22 is contoured according to curve III in Fig. 1A which represents relations of values of $$\frac{Wf}{\delta\sqrt{\theta}}$$

to values of $$\frac{N}{\sqrt{\theta}}$$

which are such as to cause compressor surge. Cam 22 is laid out according to radial lines angularly spaced from a starting line according to $$\frac{N}{\sqrt{\theta}}$$

taking into account change in angular position of lever 26. The lengths of the radial lines, taking into account, the radius of the roller 24, are according to the logarithms of the values on surge schedule curve III. Therefore, it is apparent that cam 21 is contoured according to $$\log \frac{Wf}{\delta \sqrt{\theta}}$$

Since curve III is not concerned with turbine temperature, as in the case of temperature schedule curve I, $\sqrt{\theta}$ is eliminated from the control by cam 22 on lever end 26a. This is effected by supporting lever fulcrum 28 on rod 33 which moves according to ¼ log $\theta$. As $Tt2$ increases, rod 33 moves up, and lever end 26a is moved by rod 33 according to 2 times ¼ log $\theta$. As N increases, cam 22 rotates clockwise and lever end 26a moves up. The resultant of the up movement of lever end 26a imparted by cam 22 and rod 33 is $$\log \frac{Wf}{\delta} - \log \sqrt{\theta} + \log \sqrt{\theta} = \log \frac{Wf}{\delta}$$

Therefore the control of fuel flow may be according to curve III if conditions are such that a part of curve III is below curve I. Curve III represents surge conditions when the compressor inlet temperature is at a standard value, for example, 59° F. When this temperature is lower than standard, more of curve III is below curve I, and less when this temperature is higher than standard. If this temperature is enough higher than standard, curve III is wholly above curve I and control of fuel flow to attain a maximum turbine temperature is in accordance with line I and is effected by the control of lever end 25a.

Rod 50, operated by compressor inlet pressure ($Pt2$) sensor D, is moved according to ½ log $\delta$ and in a direction such that its algebraic sign is plus when fuel is increased. Since rod 40 is permitted to move according to $$\log \frac{Wf}{\delta}$$

the resultant movement of rod 43 and lever 44 is according to $$\log \frac{Wf}{\delta} + 2 \text{ times } \frac{1}{2} \log \delta = \log Wf$$

Rod 46 moves according to ½ log $Wf$, and, by gearing to be described, causes a movable member of valve V to move according to log $Wf$. The fuel metering ports of valve V are shaped on a log basis so that area of opening is according to $Wf$ required for a particular fuel having a standard density $H_d$.

A densitometer or fuel density sensor D detects fuel density H and imparts to rod 60 a movement which causes a movement of lever 61 pivoted on floating fulcrum 62 and a movement of link 63 connecting levers 61 and 44 in accordance with log $$\frac{H}{H_d}$$

and in such direction that, if the fuel is more dense than standard, the valve V is moved toward closed position; and, vice versa if the fuel is less dense than standard. In this way the B. t. u. values are such as to satisfy conditions.

Cam 22 is the governor surge cam which is contoured so that surging of the compressor will not occur. In a certain speed range, it lifts follower roller 24 and causes lever end 26a to take a position that limits rise of rod 40 so that the fuel is less than called for by cam 21 so that surge is prevented.

If the compressor is not up to standard due to fouling or puncturing its case, the fuel must be reduced. For this purpose there is a rod 69 which is moved by a compressor outlet pressure senser E according to log $Pt4$ actual ($Pt4$ being actual compressor outlet pressure, absolute). As rod 40 moves up in accordance with $$\log \frac{Wf}{\delta}$$

it moves up end 70 of a lever 71 pivoted on a floating fulcrum 72 carried by rod 13 and urged upwardly by a spring 71a so that a part 73 of said lever engages a cam 84 pivotally supported at 85 by a rod 74 and having a notch receiving a fixed pin 84a. Rod 74 is connected with a lever 75 pivoted on a floating fulcrum 76 carried by rod 50 and connected by a link 77 with a lever 78 pivoted at 79 and connected by a link 80 with a lever 81 pivoted on a floating fulcrum 82 and having an end 81a located between shoulders 69a and 69b of rod 69. Floating fulcrum 72 is carried by rod 13 which moves up when speed increases. Assuming operation above OI (operation idle), part 73 moves up when rod 40 moves up. Since rod 13 moves according to log N and rod 40 moves according to log $$\frac{Wf}{\delta}$$

rod 74 moves up in some relation to these factors as they increase. The leverage is such that 74 moves according to a relation which the compressor should have if it were working properly. In other words, according to a nomograph, for a given air pressure $Pt2$ at its inlet, the compressor should produce a certain outlet pressure $Pt4$ when fuel is a certain $Wf$ and speed is a certain value N. Therefore, the linkage is such that movement of rod 74 is in accordance with $$\log \frac{Pt_4}{\delta}$$

$Pt_4$ being a standard for certain values of N and $$\frac{Wf}{\delta}$$

As rod 50 which carries floating fulcrum 76 senses log $\delta$, link 77 moves according to log $Pt_4$ and likewise link 80. Link 80 moves then according to a computed or standard value of $Pt_4$ and up as the standard increases. If the compressor is up to standard, rod 69 moves down the same distance that link 80 moves up.

If actual $Pt_4$ is below standard $Pt_4$, according to the nomograph, rod 69 will not move down as far as link 80 moves up. Therefore, lever 81 will be moved clockwise about shoulder 69b as a fulcrum, thus raising 82 and 62 and causing lever 61 to move clockwise and link 63 to move up to cause rod 46 to move up to reduce fuel flow. If the actual compressor outlet pressure $Pt_4$ is equal to or above the standard $Pt_4$, there will be no reduction of fuel flow.

The reduction of fuel flow, when actual compressor outlet pressure $Pt_4$ is below the nomograph standard, does not occur when the computer is in a status below operation idle (OI). During this status, when rod 40 moves up, its shoulder 70b engages end 70 of lever 71 and causes lever 71 to pivot on fulcrum 72 and to push up follower 73 which spring 71a urges against cam 84 pivoted on rod 74 at 85 and having a fork which receives a fixed pin 84a. As rod 74 moves up during OI, cam 84 rotates and presents to follower 73 a surface such that rod 74 is moved to set up a fictitious value of actual $Pt_4$ above the standard $Pt_4$ value so that no reduction is fuel flow will occur.

A pilot's lever 90 which sets a propeller blade pitch governor G for a desired engine speed imparts movement to a rod 90' which operates an arm 91 connected with a cam 93 engaged by a follower 95 connected with a rod 97. When lever 90 is moved to set the governor G for a desired speed, cam 93 is positioned to select the fuel required for the desired speed according to a predetermined schedule. Rod 97 is connected with lever 99 pivoted at 100 and connected by link 101 with lever 102 rotatable on a pivot 103 which in a manner to be described is supported for vertical movement in Fig. 1. Pivot 103 supports a disc 104 which is located between levers 105 pivotally supported at 105a by rod 30. A C-spring 106 causes levers 105 to bear against the disc 104. Lever end 102a is between shoulders 102b and 102c of rod 40.

In operation idle (OI), the pivot 103 of lever 102 cannot move vertically because lever 102 is confined between fixed rollers 108 in vertical alignment. If rod 30 moves vertically, spring 106 yields to permit movement of one or the other of the levers 105 on a pivot 105a while disc 104 remains fixed. In OI, cam 93 positions lever end 102a and rod 40 to obtain the fuel required for idling.

On going out of OI, lever 102 becomes tilted clockwise from the position shown so that its pivot 103 can move vertically. Then pivot 103 can be moved by rod 30 acting through levers 105 which spring 106 urges against disc 104 supported by pivot 103. Rod 30 moves pivot 103 according to ½ log $\theta^{-d}$ and lever end 102a is moved by rod 30 according to log $\theta^{-d}$. Exponent $d$ is a correction factor which compensates for deviation of $\theta$ from 1 so that lever end 102a will move in accordance with $$\frac{Wf}{\delta}$$

values which are determined by the pilot controlled cam 93.

When ascent from the ground is desired, the pilot operates cam 93 to cause lever 102 to move clockwise and lever end 102a to allow rod 40 to be moved above OI setting to obtain the fuel required for desired engine speed. As speed increases, lever end 25a moves up. If the pilot calls for more fuel than the engine can handle without exceeding a safe operating temperature, lever end 25a stops upward movement of shoulder 35 of rod 40 and prevents rod 40 from rising to give fuel flow which would cause temperature rise above a safe value, such as 2160° R. even though the speed had not attained the maximum.

Referring to Fig. 1A, curve II represents a schedule of values of $$\frac{Wf}{\delta\sqrt{\theta}}$$

in relation to $$\frac{N}{\sqrt{\theta}}$$

for a particular engine, said schedule being for values above operation idle and in the cruise range as determined by the pilot controlled cam 93. The fuel selected for cruising is less than that which would result in attainment of maximum allowable turbine temperature as indicated by the location of curve II below curve I. When rapid acceleration from speed value $a'$ to $d'$ is required, the pilot moves cam 93 to call for fuel value $c$. Fuel is increased from value $a$ to value $b$ as indicated by line A—B. Fuel increases from $b$ to $c$ as indicated by line B—C on curve III which represents the control by cam 22 to prevent surge. The fuel remains at value $c$ as represented by line C—D which is the value required for cruising at speed $d'$. If the outside temperature were so high that surge curve III were entirely above curve I, no surge would have been encountered. Fuel would have increased as indicated by line A—E when the higher speed $d'$ was demanded and then as indicated by line E—F as determined by the temperature curve I while speed increases.

Movement of the rod 90' by pilot's control lever 90 causes movement of an arm 92 connected with a cam 94 engaged by a cam follower 96 connected with a rod 98 providing a pivot 110a for a lever 110 pivotally connected at 111 with a rod 111a which carries the floating fulcrums 62 and 82 of levers 61 and 81 respectively. Lever 110 has a fulcrum 112 with which shoulders 113 and 114 of rod 13 are engageable. When the pilot's lever is in the range of positions above OI for obtaining positive blade angle and forward thrust, cam 94 selects a speed which is 3% greater than the desired speed for which the pilot's lever has set the propeller pitch governor. Therefore, propeller pitch governor is permitted to control engine speed. If actual speed begins to exceed 103% (for example) of desired speed, rod 13 moves up to cause shoulder 113 to engage pivot 112 of lever 110 and to move lever 110 counterclockwise about pivot 110a to cause upward movement of rod 111a to reduce fuel flow. If actual speed exceeds desired speed by 108% (for example), valve V will reduce fuel flow by a substantial percentage, for example 37%, of what the flow had been before actual speed had exceeded 103% of desired speed.

In the range of pilot lever positions for setting the propeller pitch governor G to obtain negative pitch, this governor is not active to control speed. Cam 94 is contoured to select the desired speed for negative thrust operation. If actual speed exceeds the speed selected by cam 94 in the negative thrust range, fuel flow is immediately reduced.

Rod 98 is connected with a lever 120 pivoted at 121 on a rod 122 urged upwardly by a spring 123 to a certain normal location. Lever 120 has an end member 124 located between stops 125 and 126 of the rod 10. If, due to any of the burners going out, actual speed falls to value such as 92% to 95% of selected speed, rod 122 moves to effect closure of a micro-switch 127 which causes the ignition to be effective to light the extinguished burners.

The parts identified by reference numbers in Fig. 1 are shown in other figures, as follows:

| Part | Figures | Part | Figures |
|---|---|---|---|
| 10 | 2, 5, 6, 12, 12A, 12B. | 35 | 10. |
| 11 | 2, 12, 21, 22. | 36 | 10. |
| 12 | 12. | 37 | 19. |
| 13 | 13, 21, 26, 26B. | 38 | 19. |
| 14 | 13, 21, 21J, 24. | 40 | 2, 6, 9, 16, 18, 19, 21. |
| 15 | 13, 24. | 41 | 18, 25. |
| 16 | 13. | 42 | 18, 25. |
| 17 | }(part 17–18), in Fig. 13. | 43 | 17, 17C, 10. |
| 18 | | 44 | 17, 22. |
| 19 | }(part 19–20) in Figs. 2, 5, 10, 10A, 13, 19. | 44a | 17. |
| 20 | | 45 | 17. |
| 21 | 2, 5, 10, 10A, 19. | 46 | 17, 17D. |
| 22 | 5, 10, 10A, 19. | 47 | 2, 20. |
| 23 | 2, 5, 10. | 50 | 2, 5, 6, 16, 18, 18A, 25. |
| 24 | 5, 19. | 60 | 12, 12C, 12D, 12E, 22. |
| 25 | 2, 10, 10B, 23. | 61 | 12, 14, 14A, 14B, 17, 22. |
| 25a | 10. | 62 | 14A, 14D. |
| 26 | 19, 21, 24. | 63 | 17, 17A, 17B, 22. |
| 26a | 19. | 69 | 2, 5, 6, 14. |
| 27 | 10, 23. | 69a | 14. |
| 27' | 10. | 69b | 14. |
| 28 | 19, 24. | 70 | 21. |
| 30 | 2, 6, 8, 8A, 8B, 8C, 23. | 71 | 6, 21, 21J, 21K, 26. |
| 31 | 8, 9, 10, 15, 23. | 72 | 26. |
| 32 | 15, 23. | 73 | 21. |
| 33 {33A | 13, 19, 23, 24, 24A, 24B. | 74 | 16, 21 (21A–21G). |
| 33B | 13, 24. | 75 | 16, 21. |
| 33C | 19, 24. | | |
| 76 | 16, 25. | 101 | 2, 9, 9G, 9H, 9J. |
| 77 | 15, 15A, 15B, 16. | 102 | 2, 9, 9D. |
| 78 | 15. | 102a | 6, 9. |
| 79 | 15. | 102b | 6, 9. |
| 80 | 14, 15, 15C. | 102c | 6, 9. |
| 81 | 14, 14A, 14C, 26. | 103 | 1, 6, 9, 9D, 9E. |
| 82 | 14, 14A, 14C, 26. | 104 | 8C, 9E. |
| 84 | 21, 21A, 21C. | 105 | 2, 8, 8A, 8C. |
| 84a | 21. | 106 | 6, 8, 8A, 8C. |
| 85 | 21. | 108 | 9. |
| 90 | 33. | 110 | 14, 21, 26. |
| 91 | 5, 6, 33. | 111 | 22, 26. |
| 92 | 5, 6, 33. | 111a | 14 to 14F, 22, 26. |
| 93 | }(93–94) in Figs. 5, 6, 33. | 112 | 26. |
| 94 | | 113 | 26. |
| 95 | 2, 5, 6, 9, 9A, 9C. | 114 | 26. |
| 96 | 5, 6, 27. | 120 | 2, 11. |
| 97 | 2, 5, 6, 9, 9A, 9B, 9C. | 121 | 11. |
| 98 | 5, 6, 26, 26A, 26B. | 122 | 11, 11A. |
| 99 | 2, 9. | 124 | 2, 11. |
| 100 | 2, 9. | 125 | 11. |

Referring to Figs. 2–6, the computer assembly includes brackets or bulk heads 200, 201 which provide guides for the rods described with reference to Fig. 1 and other views. Head 200 has lugs 202 (Fig. 4) and head 201 has lugs 203 (Fig. 3). These lugs appear in Fig. 35. As shown in Fig. 36, a lug 202 is supported by a pad 205 integral with a wall 206 of a housing for enclosing the computer. A dowel washer 207 locates the lug 202 with respect to the pad 205 and a screw 208 secures these parts together. The other lugs are attached to other pads 205 in a similar manner.

The pilot controlled lever 90 (Fig. 1) appears in Fig. 33 as a lever 90 attached to a shaft 90' connected with lever 91. The cams 93 and 94 (Fig. 1) are provided by a blade 93—94 (Fig. 33) connected with lever 92 journalled as shown in Fig. 7 on a rod 92a supported by a bracket 92b guided by head 200 and prevented from rotating by a key 92e. By turning a screw 92c, the rod 92a can be adjusted to adjust the relation of blade 93—94 (Figs. 5, 6 and 33) relative to the rollers 95 and 96 carried by rods 97 and 98 respectively. Nut 92d fixes screw 92c in adjusted position.

The parts 102–108 appearing in the lower left portion of Fig. 1 are shown in Figs. 8–8C and 9–9D. Rod 30 carries pivot pins 105a (Fig. 8–C) for two arms 105 which a single C-spring 106 presses against disc 104 which is part of an assembly (Fig. 9–E) which includes lever 102 which receives a washer 103a journalled on pivot screw 103 which supports rod 103b and part 104. The rollers 108 (Fig. 1) are rotatively supported by heads 200 and 201 (Fig. 9). In the position shown, lever 102 cannot move vertically. This is the operation-idle position of lever 102. During regimes other than operation idle, lever 102 turns into position such that surfaces 102s thereof are adjacent rollers 108. Then lever 102 can be moved vertically by lever 30 acting through spring 106 and arms 105 on disc or washer 104.

Parts 16–26 shown in the lower right portion of Fig. 1 appear in Figs. 10, 10A, 10B, 13 and 19. Rod 16 provides one rack 17—18 which meshes with one pinion 19—20 provided by a shaft 19s—20s which, as shown in Fig. 10A has journals 210 each supported by a two-piece bearing having parts 211—212. These bearings are attached to head 200. Shaft 19s—20s supports and drives cams 21 and 22. Back-lash is taken out by a spring 220 (Figs. 5, 5A, 10A) attached at one end to head 201 and at the other to a metal ribbon 221 coiled around shaft 19s—20s and attached thereto by a rivet 222. The ribbon 221, shown uncoiled in Fig. 5B, has two holes 223 and the ribbon is doubled back on line 224 so that the holes 223 are aligned to receive an eyelet 225 which receives one end of the spring 220. The hole 226 in ribbon 221 receives the rivet 222.

The pivot 12 of lever 11 (Fig. 12) is supported by a rod 12a fixed to head 201. The pivot 79 of lever 78 (Fig. 15) is supported by a rod 79a fixed to head 201. Head 200 supports the pivot 32 of lever 31. The pivot 76 of lever 75 (Fig. 16) is supported by a rod 76a slidable in heads 200 and 201.

The rod 33 appearing near the lower middle portion of Fig. 1 represents three rods 33A, 33B and 33C (Fig. 24) which together perform the function of the rod 33.

Lever 71 shown in the upper left portion of Fig. 1 appears in Figs. 21 and 21M. Springs 71a (two appear in Fig. 6), connected with a stud 71b attached to lever 71 and to a stud 71c attached to head 201, urge part 73 of lever 71 against a cam lever 84 rotatable on a pivot 85 carried by rod 74 and having a notch which receives a fixed roller 84a supported by head 201. The parts shown in Fig. 21 are status below operation idle. From the regime below operation idle to the regime above operation idle, rod 40 moves left in Fig. 21 which is the same as upward movement in Fig. 1. Shoulder 70b of rod 40 engages end 70 of lever 71; and, follower 73 of lever 71 pushes left against cam 84 pivoted at 85 on rod 74. As rod 74 moves left, cam 84 rotates clockwise and, during the regime below operation idle, presents to follower 73 a portion of its cam surface so shaped that rod 74 sets up a fictitious value of $Pt4$ so that fuel reduction cannot occur during this regime although actual $Pt4$ might be less than a standard value in relation to $Pt2$. Above operation idle, the cam 84 presents to follower 73 a surface which is substantially concentric with pivot 85, thus permitting the comparison of actual $Pt4$ with standard $Pt4$ according to a nomograph schedule.

The engine speed sensor A in Fig. 1 includes, as shown in Fig. 28, an engine driven shaft 240 which drives a cage 241 supporting a flexure ring 242 which carries weights 243 which, as engine speed increases, move away from shaft 240 and cause the ring 242 to bend about a circle of contact with the cage 241. The inner ends of lever 244 attached to weights 243 move right in Fig. 28, to cause right movement of a grooved collar 245 and pins 246 received thereby. A lever 247 which carries pins 246 rotates clockwise on a pivot 248 and causes left movement of a valve rod 249 which is part of a hydraulic servo 250 which includes a cylinder 251 enclosing a piston 252 which follows the valve rod 249 and which is connected with a rod 253 which has a rack 254 meshing with a pinion 255 which a shaft 256 connects with a plate 257 providing a cam slot 258 which receives a roller 259 carried by a lever 260 pivoted at 261 and connected with rod 10 (Fig. 1). Cam slot 258 has a contour such that displacement of rod 10 is according to log N (engine speed).

Details of the engine speed sensor A are disclosed in the copending application of Dolza et al., S. N. 246,116, filed September 11, 1951.

The compressor inlet air temperature sensor B (Fig. 1) comprises, as shown in Fig. 29, two thermostat blades 270 located in the path of movement of air flowing into the jet-engine compressor. Blades 270 are anchored to blocks 271 attached to arches 272 and 273, the former being fixed at 274, and the latter being connected with a rod 275 which extends through a fixed part 276 which confines a compression spring 277 which causes the blades 270 to be taut. Expansion and contraction of blades 270 causes lengthwise movement of rod 275 which causes rotation of a shaft 280 through the use of an eye portion 275a of rod 275 which receives a nut 278 which has a spherical periphery and which is threaded on a lever 279 attached to shaft 280. Shaft 280 moves a cam 281 engaged by a follower 282 carried by a lever 283 pivoted at 284 and urged clockwise by a spring 285. Lever 283 operates a valve 286 of an hydraulic servo 287 which includes a piston 288 which follows the valve 286 and causes corresponding movement of a rod 289 connected by a turnbuckle 290 (for adjustment) with rod 30 (Fig. 1).

Cam 281 has a contour such that displacement of rod 30 is according to $\frac{1}{2} \log \theta^{-d}$.

Further details of the temperature sensor B are disclosed in the copending application of Dolza et al., S. N. 246,852, filed September 15, 1951.

The compressor inlet pressure senser C (Fig. 1) includes, as shown in Figs. 30 and 31, a housing 290 which is connected with the compressor inlet and which encloses an evacuated bellows or aneroid represented by circle 290b. This bellows expands or contracts according to variation in compressor inlet pressure and causes movement of a lever 291 which a shaft 292 connects with a lever 293 connected with the valve 294 of an hydraulic servo 295 including a cylinder 296 containing a piston 297 which follows the valve 294 and effects the positioning of a rod 298 carrying a roller 299 engaging a cam lever 300 pivoted at 301. Lever 300 carries a screw 302 for abutting a lever 303 also pivoted at 301 and urged counterclockwise by a spring 304. Lever 303 is connected with rod 50 (Fig. 1). Cam 300 has a contour such that rod 50 is positioned in accordance with $\frac{1}{2} \log \delta$.

The compressor outlet pressure senser E (Fig. 1) includes, as shown in Fig. 30, a housing 310 which is connected with the compressor outlet and which encloses an evacuated bellows or aneroid represented by circle 310b. This bellows expands or contracts according to variation in compressor outlet pressure and causes movement of a link 311 which a shaft 312 connects with a lever 313 which, like lever 293, controls an hydraulic servo 315 constructed like servo 295 and causing horizontal movement of a roller 319 (Fig. 32) which corresponds in function to roller 299 (Fig. 31). Roller 319 engages a cam lever 320 pivoted at 321 and carrying a screw 322 for abutting a lever 323 also pivoted at 321 and urged counterclockwise by a torsion spring 324, one end 324a bears against lever 323 and the other end 324b of which bears against a fixed part 325. Lever 323 is connected with rod 69 (Fig. 1). Cam 320 has a contour such that rod 69 is positioned in accordance with a logarithm of absolute pressure at the outlet of the compressor.

Details of the pressure sensing devices C and E (Fig. 1) are disclosed in the copending application of Dolza and Harvey, S. N. 208,798, filed January 31, 1951.

The fuel density senser or densitometer D (Fig. 1) is a device which causes angular displacement of a shaft 330 (Fig. 34) in accordance with fuel density as determined by the densitometer D, the details of which are disclosed in the copending application of John Dolza, S. N. 242,568, filed August 18, 1951. Shaft 330 is connected with a disc 331 having a cam slot 332 which receives a roller 333 carried by a lever 334 pivoted at 335 and connected with the valve rod 336 of an hydraulic servo 337 which includes a cylinder 338 containing a piston connected with a rod 339 connected by a turnbuckle (for adjustment) with rod 60 (Fig. 1). The piston rod 339 follows the valve rod 336. The cam slot 332 has a contour such that rod 60 is positioned in accordance with log $$\frac{H}{H_d}$$

H being the fuel density sensed by the densitometer D and $H_d$ being a certain standard of fuel density.

If the densitometer is not required, the rod 60 is fixed as shown in Fig. 12 to head 200 by nuts 60n.

The construction of valve V shown in Fig. 1 is described and claimed in the copending application of Dolza et al., S. N. 246,851, filed September 15, 1951.

As shown in Figs. 37–40, valve V includes a fixed orifice plate 340 mounted in a housing 342 and a movable disc 341. Plate 340 has a triangular orifice 343 bounded by a narrow surface 344 which is provided by a thin, triangular boss 345 surrounding the orifice. The surface 344 extends from the upper side of the boss 345 to a flaring surface 346 extending around the orifice. The disc 341 has a beveled surface 347 tapering to a thin peripheral edge having the proper contour for determining the area of orifice opening in the plate 340 according to a predetermined schedule of angular positions of disc 341. When valve V is used with the present computer, the schedule is such that the required Wf, weight of fuel per unit of time, will be such that, when the disc 341 is moved in accordance with log Wf, the area of orifice opening in plate 340 will be such as to pass fuel at rate Wf as determined by the computer. The opening through which the fuel can pass is sharply defined by the thin edge of disc 341 and the narrow bounding surface 344 of the orifice 343, and a pressure regulator is used to maintain a predetermined difference in pressure above and below the orifice. Therefore, the flow rate Wf can be accurately determined by the position of disc 341.

The disc 341 is urged against the boss 345 and a straight boss 348 of plate 340 by a spring 350 confined between disc 341 and a coupling 351 which a pin 352 attaches to a shaft 353. Coupling 351 provides diametrically opposite notches 354 which receive lugs 355 provided by disc 341. The connection between shaft 353 and disc 341 is such that the spring 350 is effective to seat the disc 341 upon the bosses 345 and 348 although the axes of shaft 353 might be slightly out of perpendicular with the plane of the upper surfaces of these bosses. The axis of rotation of the disc 341 lies substantially in the axis of rotation of the shaft 353. The fuel above the plate 340 is under relatively great pressure, but because the underside of disc 341, except where it engages the bosses 345 and 348, is in contact with the pressurized fuel, the disc 341 is pressed against these bosses with relatively small unit pressure sufficiently only to prevent leakage of fuel between the disc and boss 345. Therefore, the resistance to movement of disc 341 due to friction between the disc and the bosses is relatively small and it does not interfere with proper control of the disc by the computer.

Shaft 353 is journalled by the shank 356 of a cup member 357 and by a bearing 358 retained by said shank. Shaft 353 is connected with a gear 360 meshing with a gear 361 journalled on a pin 362 and meshing with a gear 363 journalled by a plate 364 which screws 365 (Fig. 37) attach to housing 342, said plate 364 being located by pin 362 and by a dowel pin 366.

The shank or hub 367 of gear 363 provides tapered coupling lugs 368 which are received by notches 369 (Fig. 20) in a coupling 370 provided by shaft 47 which is turned by the gear 47a which meshes with rack 46 (Figs. 17 and 17E). Lost motion at the coupling connecting shaft 47 with gear 363 is taken up by a compressed spring 371 (Fig. 38) which is confined between gear 363 and a thimble 372 urged by the spring against a button 373 seated upon housing 342. Alignment of hub 367 and shaft 47 is provided by a rod 374 fixed to hub 367 and received by a central hole in the shaft.

Spring 48 (at top of Fig. 1) represents a torsion spring 380 (Figs. 37–39) which is located in cup 357 and is spaced from gear 360 by a spacer 380a. Cup 357 is retained in housing 342 by a plate 381 secured to housing 342 by screws 382. As shown in Fig. 39, one end 383 of spring 380 is fixed to the cup 357 and the other to the gear 360. Spring 380 biases the gear 360 and shaft 353 clockwise as viewed in Figs. 37 and 39. Therefore, spring 380 biases disc 341 counterclockwise as viewed in Fig. 40. Spring 380 tends to increase fuel flow through the orifice 343 and it corresponds in function to spring 48 in Fig. 1.

Spring 380 biases gear 360 (Fig. 38) clockwise, gear 361 counterclockwise, gear 363 clockwise, gear 47a clockwise (looking down in Fig. 38) and as viewed in the direction of arrow 17E in Fig. 17. Therefore, spring 380 biases rod 46 up in Fig. 17. Rod 63 being considered fixed for the moment, rod 43 is biased up. Since rod 43 (Fig. 18) is biased up, lever 41 is biased clockwise and rod 40 is biased down. Therefore, in Fig. 10, lever 25 is biased clockwise so that its roller 23 engages cam 21. Therefore, after rod 40 has been permitted to move down to cause its shoulder 37 to engage lever end 26a in Fig. 19, the surge preventing cam 22 can exercise control to prevent surge.

When, after the operation idle regime, rod 40 is biased down to cause its shoulder 102b (Fig. 9) to be biased clockwise, rod 97 is biased down so that its roller 95 is pressed against cam 93—94 in Fig. 5.

Since spring 380 biases rod 46 up in Fig. 17, rod 63 is biased up. Lever 61 engaged by rod 63, is biased up and rod 111a (Fig. 14A) is biased up and toward a stop screw 111b in Fig. 26. As rod 10 moves up in Fig. 12 with speed increase, rod 13 moves down in Figs. 12 and 26. At a certain speed, shoulder 113 of rod 13 engages lever portion 112 of lever 110. Therefore, since spring 380 biases rod 111a up, lever 110 is biased clockwise in Fig. 26, and rod 98 is biased down and its roller 96 is biased against cam 93—94 in Fig. 5.

Therefore, spring 380 effects engagement of cams 21, 22 and 93—94 by their respective cam rollers and loads the mechanism so that lost motion is taken up in the movement transmission between these cams and the movable orifice plate 341.

Spring 380 performs the same function as spring 48 in Fig. 1 and also the functions of springs 97a and 98a. The two springs 71a shown in Fig. 6, one of which is shown in Figs. 21 and 21M, are called anti-reversal springs. Their purpose is to prevent the load on rod 40 from reversing when the computer goes into cut-off position.

The assembly unit shown in Figs. 41–46 is adapted to be mounted on the housing of the compressor of an internal combustion turbine. The unit includes a housing 400 which, as shown in Figs. 41, 42, 43 and 45 encloses the computer. Housing 400 supports instruments B, C and E as shown in Figs. 43, 44 and 45. The unit includes housing 401 which receives the speed sensor A or governor and a fuel pump as indicated in Figs. 42, 43 and 46 and valve V as indicated in Figs. 44 and 46. The fuel pump pressurizes the fuel before it passes through valve V. The pressure regulator whose location is indicated in Figs. 43, 44 and 46, maintains a constant pressure differential with respect to the inlet and outlet of valve V. Housing 401 supports a frame 403 (Fig. 44) which, together with housing 401, supports a shaft 404 which becomes connected with the turbine accessory drive when the frame 403 is attached to the accessory drive housing 405 shown in dot-dash lines in Fig. 44. Shaft 404 drives the governor A and the fuel pump. The unit as shown does not include the fuel density senser D. If sensor D were to be included in the unit, that part of housing 401 which encloses the fuel pump would be extended to the left in Fig. 46.

The single manually controlled lever for the unit is shown at 90 in Figs. 41, 43, 44 and 46.

Summary

From the foregoing description of an embodiment thereof, it is apparent that the invention includes a movable member for determining the area of opening of a fuel flow-metering orifice, said member being operated as follows:

(1) By a lever operated by the pilot to maintain a fuel flow sufficient for the speed which the pilot selects by control of the setting of a blade angle controller of the propeller which is driven by the engine, (2) By means under control by devices which, respectively, sense compressor inlet temperature, engine speed, and compressor inlet pressure for the purpose of obtaining fuel flow no greater than required to obtain engine operation at a certain maximum turbine temperature, (3) By means under control by the compressor inlet temperature sensor and the engine speed sensor for the purpose of reducing fuel flow to prevent compressor surge, (4) By means under control by the engine speed sensor for reducing fuel flow when actual engine speed exceeds selected engine speed by an amount greater than a predetermined value, (5) By means under control by the engine speed sensor when the pilot conditions the propeller blade angle controller for negative blade angle, (6) By means under control by devices which, respectively, sense compressor inlet and outlet pressures, to reduce fuel flow when compressor outlet pressure is below a certain standard or nomograph value with respect to compressor inlet pressure, said means being non-operative during operation idle, (7) By means under control by a fuel density sensor which reduces or increases fuel flow according to whether fuel density is greater or less than a standard value.

The invention includes means under control by the speed senser for causing the burner fuel ignition apparatus to be operative when actual engine speed is more than a predetermined amount below selected engine speed.

While the embodiment of the present invention as herein disclosed constitutes a preferred form, it is to be understood that other forms might be adopted.

What is claimed is as follows:

1. Apparatus for controlling flow of fuel to the burners of an internal combustion turbine engine comprising a fuel flow metering valve having a member providing an orifice and an orifice controlling member one of which is movable, a manually operable control lever for setting the blade angle controller of a propeller driven by the engine to maintain a selected speed in the positive thrust range, means under control by the lever for positioning the movable valve member to maintain fuel flow required for the selected speed, an engine compressor inlet temperature sensor, an engine speed sensor, a compressor inlet pressure sensor, and means under control by said sensers for limiting movement of the movable valve member to increase fuel flow in order to obtain fuel flow no greater than that which will cause engine operation at a certain maximum turbine temperature.

2. Apparatus according to claim 1 including means under control by the engine speed sensor and the compressor inlet temperature sensor for causing movement of the valve member to decrease fuel flow in order to prevent compressor surge.

3. Apparatus according to claim 1 including means under control by the engine speed sensor for causing movement of the valve member to reduce fuel flow when actual engine speed exceeds selected engine speed by a predetermined amount.

4. Apparatus according to claim 1 including means under control by the engine speed sensor for causing operation of a burner fuel ignition controller to render burner ignition operative when actual engine speed is more than a predetermined amount less than selected engine speed.

5. Apparatus according to claim 1 and including means rendered operative by the control lever when it is moved into a position in range for selecting a negative blade angle by conditioning of the propeller blade angle controller, for effecting control of the valve member by the engine speed sensor in accordance with a predetermined schedule of speed in relation to negative blade angle.

6. Apparatus according to claim 1 and including a compressor outlet pressure sensor and means under control by the compressor inlet and outlet pressure sensor for effecting a movement of the valve member to reduce fuel flow when compressor outlet pressure is below a certain value with respect to compressor inlet pressure.

7. Apparatus according to claim 1 and including a compressor outlet pressure sensor and means under control by the compressor inlet and outlet pressure sensor for effecting a movement of the valve member to reduce fuel flow when compressor outlet pressure is below a certain value with respect to compressor inlet pressure, and a device for rendering said means non-operative during the operation idle regime of engine operation.

8. Apparatus according to claim 1 and including a fuel density sensor and means under control by the fuel density sensor for effecting movement of the valve member to reduce or increase fuel flow according to whether fuel density is greater or less than a standard value.

9. A controller for controlling the flow of fuel to the burners of an internal combustion turbine engine having an air compressor driven by the turbine and provided with a speed governor adjustable to cause operation of the engine at different speeds, said controller including a valve having a fuel metering orifice and a movable member for variably restricting the orifice to obtain a required flow rate, a mechanism for controlling the movable valve member, and including means for signalling a function of the relation of compressor inlet air absolute pressure to sea level absolute pressure, manually controlled means for controlling said mechanism and operating to signal flow rates according to a predetermined schedule of flow rate values in relation to engine speed values for turbine operation at a temperature below a safe maximum value and based on sea level operation and unity value of the relation of compressor inlet absolute temperature to a standard absolute temperature, and means for limiting operation of the mechanism so as to limit fuel flow to an amount such that maximum turbine temperature is not exceeded during the transition period of operation following change of the speed setting of an engine governor whose speed setting control is coordinated with control of said manually controlled means, said limiting means including a cam contoured according to a predetermined schedule of function of fuel rate and functions of engine speed such that turbine temperature is limited to said safe maximum value when operating at sea level and when the relation of compressor inlet absolute temperature to a standard absolute temperature is unity, a compressor inlet temperature sensing means, an engine speed sensing means, means under control by the inlet temperature sensing means for signalling a function of said temperature relation, means under control by the speed sensing means for signalling a function of engine speed, means under control by both signalling means for moving the cam, a cam follower controlled by the cam for controlling the mechanism and means under control by the temperature-relation-function signalling means for producing signals affecting control by the manually controlled means and control by the cam folower to compensate for deviation from unity of said temperature relation when ambient air temperature varies in a range between certain limits.

10. A controller for controlling the flow of fuel to the burners of an internal combustion turbine engine having an air compressor driven by the turbine and provided with a speed governor adjustable to cause operation of the engine at different speeds, said controller including a valve having a fuel metering orifice and a movable member for variably restricting the orifice to obtain a required flow rate, a mechanism for controlling the movable valve member, and including means for signalling a function of the relation of compressor inlet air absolute pressure to sea level absolute pressure, manually controlled means for controlling said mechanism and operating to signal flow rates according to a predetermined schedule of flow rate values in relation to engine speed values for turbine operations at a temperature below a safe maximum value and based on sea level operation and unity valve of the relation of compressor inlet absolute temperature to a standard absolute temperature, and means for limiting operation of the mechanism so as to limit fuel flow to an amount such that compressor surge is avoided during the transition period of operation following change of the speed setting of an engine governor whose speed setting control is coordinated with control of said manually controlled means, said limiting means including a cam contoured according to a predetermined schedule of function of fuel rate and functions of engine speed which represents a surge schedule when operating at sea level and when the relation of compressor inlet absolute temperature to a standard absolute temperature is unity, a compressor inlet temperature sensing means, an engine speed sensing means, means under control by the inlet temperature sensing means for signalling a function of said temperature relation, means for signalling a function of engine speed, means under control by both signalling means for moving the cam, a cam follower controlled by the cam for controlling the mechanism, and means under control by the temperature-relation-function signalling means producing a signal affecting control by the manually controlled means to compensate for deviation from unity of the said temperature relation when ambient air temperature varies in a range between certain limits, and means under control by the temperature-relation-function signalling means for nullifying control of said cam follower by a function of said temperature relation.

11. A controller for controlling the flow of fuel to the burners of an internal combustion turbine engine having an air compressor driven by the turbine, said controller including a valve having a fuel metering orifice and a movable member for variably restricting the orifice to obtain a required flow rate, a manually operable cam for determining flow rate according to a predetermined schedule of flow rate values with respect to engine speed values suitable for engine operation below a certain safe maximum value of turbine temperature when operating at sea level and when compressor inlet air temperature is at a certain standard value, and when fuel has a standard density, means for sensing compressor inlet air temperature, means under control thereby for signalling a compensation for deviation from unity of the relation of compressor inlet air temperature, absolute, to standard value, absolute, means for signalling the relation of compressor inlet air pressure, absolute, to sea level pressure, mechanism under control by said cam, the compensation signalling means and the pressure relation signalling means for determining the position of the movable valve member, means for signalling the relation of compressor outlet pressure to compressor inlet pressure and means under control thereby for causing said mechanism to reduce fuel flow when the signalled relation is below a scheduled value.

12. A controller for controlling the flow of fuel to the burners of an internal combustion turbine engine having an air compressor driven by the turbine, said controller including a valve having a fuel metering orifice and a movable member for variably restricting the orifice to obtain a required flow rate, a manually operable cam for determining flow rate according to a predetermined schedule of flow rate values with respect to engine speed values suitable for engine operation below a certain safe maximum value of turbine temperature when operating at sea level and when compressor inlet air temperature is at a certain standard value, and when fuel has a standard density, means for sensing compressor inlet air temperature, means under control thereby for signalling a compensation for deviation from unity of the relation of compressor inlet air temperature, absolute, to standard value, absolute, means for signalling the relation of compressor inlet air pressure, absolute, to sea level pressure, mechanism under control by said cam, the compensation signalling means and the pressure relation signalling means for determining the position of the movable valve member, means for sensing fuel density and means under control thereby for controlling said mechanism to modify first flow rate in accordance with deviation of actual fuel density from a certain standard fuel density.

13. A controller for controlling the flow of fuel to the burners of an internal combustion turbine engine having an air compressor driven by the turbine, said controller including a valve having a fuel metering orifice and a movable member for variably restricting the orifice to obtain a required flow rate, a manually operable cam for determining flow rate according to a predetermined schedule of flow rate values with respect to engine speed values suitable for engine operation below a certain safe maximum value of turbine temperature when operating at sea level and when compressor inlet air temperature is at a certain standard value, and when fuel has a standard density, means for sensing compressor inlet air temperature, means under control thereby for signalling a compensation for deviation from unity of the relation of compressor inlet air temperature, absolute, to standard value, absolute, means for signalling the relation of compressor inlet air pressure, absolute, to sea level pressure, mechanism under control by said cam, the compensation signalling means and the pressure relation signalling means for determining the position of the movable valve member, a second manually operable cam for giving a signal of demanded speed according to a predetermined schedule with respect to demanded fuel as determined by the first mentioned manually operable cam, means for sensing engine speed, and means under control by said second manually operable cam and by the engine speed senser for causing said mechanism to reduce fuel flow when actual engine speed exceeds demanded engine speed by a predetermined amount.

14. A controller for controlling the flow of fuel to the burners of an internal combustion turbine engine having an air compressor driven by the turbine, said controller including a valve having a fuel metering orifice and a movable member for variably restricting the orifice to obtain a required flow rate, a manually operable cam for determining flow rate according to a predetermined schedule of flow rate values with respect to engine speed values suitable for engine operation below a certain safe maximum value of turbine temperature when operating at sea level and when compressor inlet air temperature is at a certain standard value, and when fuel has a standard density, means for sensing compressor inlet air temperature, means under control thereby for signalling a compensation for deviation from unity of the relation of compressor inlet air temperature, absolute, to standard value, absolute, means for signalling the relation of compressor inlet air pressure, absolute, to sea level pressure, mechanism under control by said cam, the compensation signalling means and the pressure relation signalling means for determining the position of the movable valve member, a second manually operable cam for giving a signal of demanded speed according to a predetermined schedule with respect to demanded fuel as determined by the first mentioned manually operable cam, means for sensing engine speed, a movable element for controlling the operation of burner fuel ignition apparatus and means under control by said second manually operable cam and by the engine speed senser for causing a movement of said movable element for the purpose of causing the burner fuel ignition apparatus to function when actual engine speed is a predetermined amount less than demanded engine speed.

References Cited in the file of this patent

UNITED STATES PATENTS

| | | |
|---|---|---|
| 2,457,595 | Orr | Dec. 28, 1948 |
| 2,536,158 | Chamberlin | Jan. 2, 1951 |